United States Patent
Huang et al.

(10) Patent No.: US 11,310,034 B2
(45) Date of Patent: Apr. 19, 2022

(54) SYSTEMS AND METHODS FOR SECURING OFFLINE DATA

(71) Applicant: Citrix Systems, Inc., Fort Lauderdale, FL (US)

(72) Inventors: Feng Huang, Girton (GB); Andy Cooper, Royston (GB)

(73) Assignee: Citrix Systems, Inc., Fort Lauderdale, FL (US)

(*) Notice: Subject to any disclaimer, the term of this patent is extended or adjusted under 35 U.S.C. 154(b) by 124 days.

(21) Appl. No.: 16/406,910

(22) Filed: May 8, 2019

(65) Prior Publication Data
US 2020/0358602 A1 Nov. 12, 2020

(51) Int. Cl.
H04L 29/06 (2006.01)
H04L 9/08 (2006.01)
G06F 21/60 (2013.01)
G06F 21/62 (2013.01)
H04L 9/32 (2006.01)

(52) U.S. Cl.
CPC .......... *H04L 9/0816* (2013.01); *G06F 21/602* (2013.01); *G06F 21/6218* (2013.01); *H04L 9/3234* (2013.01)

(58) Field of Classification Search
CPC ..... H04L 9/0816; H04L 67/34; G06F 21/602; G06F 21/6218
See application file for complete search history.

(56) References Cited

U.S. PATENT DOCUMENTS

| 2002/0066018 | A1* | 5/2002 | Linnartz | H04L 9/3226 713/171 |
| 2010/0230487 | A1* | 9/2010 | Johnson | G07F 7/1008 235/380 |
| 2016/0119342 | A1 | 4/2016 | Kus et al. | |
| 2018/0048464 | A1 | 2/2018 | Lim et al. | |

FOREIGN PATENT DOCUMENTS

EP    1 662 355 A2    5/2006

OTHER PUBLICATIONS

International Search Report and Written Opinion on International Appl. No. PCT/US2020/028919, dated Jul. 21, 2020.
International Preliminary Report on Patentability on PCT Appl. No. PCT/US2020/028919 dated Nov. 18, 2021.

* cited by examiner

*Primary Examiner* — Dao Q Ho
(74) *Attorney, Agent, or Firm* — Foley & Lardner LLP

(57) ABSTRACT

Described embodiments provide systems and methods for securing offline data for shared accounts of a shared computing device. Cache files can be generated for a plurality of users of an application executable on the device to store user data corresponding to individual users of the application. An encryption key can be generated for one or more of the cache files and the encryption key can be associated with at least one user of the application. The encryption key can be associated with a user identifier so that the encryption key is not accessible by other users of the computing device. The user data can be encrypted in one of the cache files with the encryption key. The encrypted user data can be presented to a user via the shared computing device based on receipt of a user identifier that enables access to the encryption key.

20 Claims, 11 Drawing Sheets

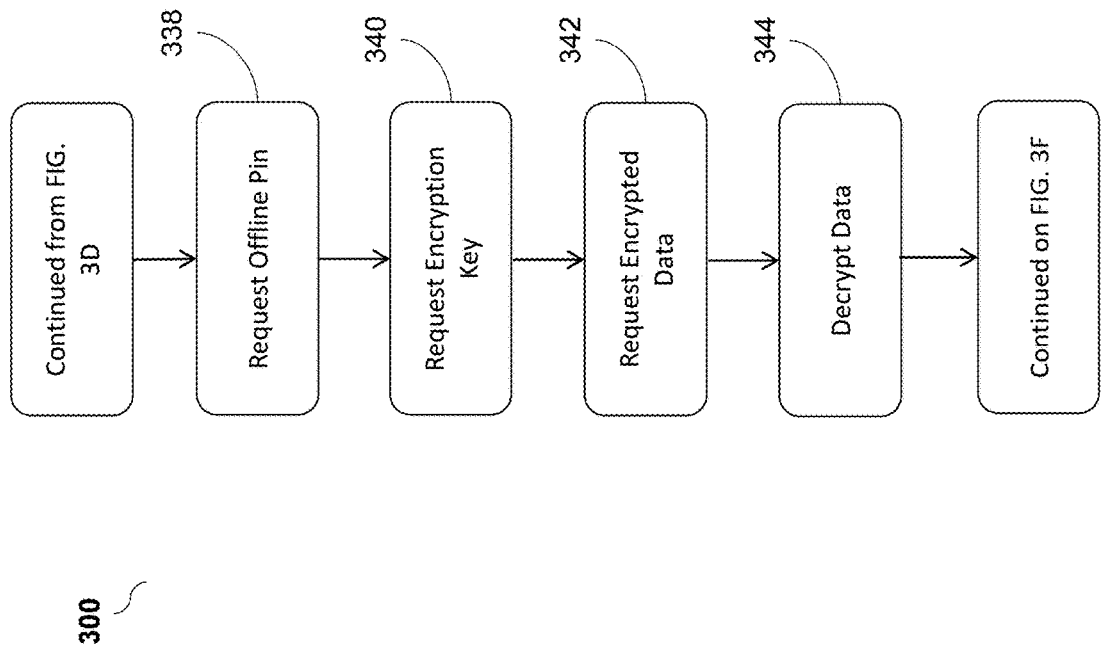

SYSTEMS AND METHODS FOR SECURING OFFLINE DATA

BACKGROUND

In network environments, users can access remote resources through a server. For example, desktop computers or other resources can be hosted and managed by a remote server for multiple users. Each user can login to the remote server to access a desktop computer or the other resources hosted by the remote server.

SUMMARY

Systems and methods for securing offline data (e.g., browser offline data) for shared accounts are provided herein. In embodiments, users can be provided access to a plurality of remote resources (e.g. applications, desktops and files) hosted on a server or cloud environment. The resources can be distributed in multiple interconnected or disconnected resource locations. A server can broker or provide access for a client device of the user to the different resource locations. In embodiments, user data, such as but not limited to browser offline data, corresponding to the remote resources can be segregated and secured using unique encryption keys for each user of a shared operating system (OS) account. For example, a different or separate cache can be generated for each user to store each user's respective user data corresponding to the remote resources. The cached data can be encrypted using the encryption key. The encryption key can be secured and protected with a pin generated by or provided by the corresponding user. The encryption key can be stored on a client device or a device accessible by the client device associated with the corresponding user. Thus, users can access the remote resources (e.g., applications, desktops, files) using the encrypted cache data when the hosting server or hosting cloud environment is not accessible from at least one client device of the user. The encryption key and pin can be unique to each user and be used to segregate access to the cached data to each user of the shared device, such that a user can access the cache data they have permission to access.

In embodiments, at a first time or initial time, a pin and encryption key can be generated for a user. For example, during an initial attempt to access a server or resources, a user can be prompted to generate a pin unique to the user. The pin can be stored at the server or remote database and encrypted to protect the pin from improper access. Responsive to a login event by the user, the trusted module can generate a unique encryption key for the user. The encryption key can be secured and protected with the pin. Thus, if the user attempts to access resources at a subsequent time, the user can provide the pin to the trusted module to retrieve the encryption key and decrypt the cache data corresponding to the respective user.

If the server is offline or otherwise inaccessible from a client device of the user, a client application executing on the client device can provide the user with an offline login prompt to provide a user ID and the pin. The client application can use the user ID to identify the encrypted cache data corresponding to the user. The client application can use the pin to retrieve the encryption key corresponding to the user. The encrypted cache data can be decrypted using the encryption key and the client application can provide the user with offline access to a remote resource using the cache data. The systems and methods described herein can provide sharing of a single pin among multiple client devices for the same user and provide ongoing access to encrypted data using the pin.

In at least one aspect, this disclosure is directed to a method. The method includes generating, by a computing device, cache files for a plurality of users of an application executable on the computing device. The cache files can store user data corresponding to individual users of the application. The computing device can be a shared computing device so that the cache files are viewable by the plurality of users using the computing device. The method can include generating, by the computing device, an encryption key for one of the cache files, the encryption key being associated with a user of the application. The encryption key can be associated with a user identifier so that the encryption key is not accessible by other users of the computing device. The method can include encrypting, by the computing device, user data in one of the cache files with the encryption key. The method can include presenting, by the computing device, the encrypted user data to a user via the shared computing device based on receipt of the user identifier and pin that enables access to the encryption key by the user. The encrypted user data can be presented without the encrypted user data or the encryption key of the user being accessible to other users of the shared computing device.

In some embodiments, the method can include storing, by the computer device, the one of the cache files in a cache database. The cache database can be accessible to the computer device when a server is offline. The one of the cache files can include the encrypted user data. Each of the cache files can be segregated in the cache databased based on the at least one user associated with the respective cache file. The method can include receiving, by the computer device and responsive to a prompt provided to the user of the application, a pin from the first user of the device. The method can include storing, by the computer device, the encryption key using the pin in a trusted module. The pin can be used to retrieve the encryption key from the trusted module. The encryption key can be used to decrypt the encrypted user data in the one of the cache files.

In embodiments, the method can include generating, by the computer device, a prompt for the user of the application through a browser of the computer device to request a pin. The method can include receiving, by the computer device and responsive to the prompt provided to the user of the application, the pin from the user of the application. The method can include storing, by the computer device, the pin for the user of the application at an authentication module of the server. In some embodiments, the method can include generating, by the computer device, a cache lookup key using the user identifier corresponding to the user of the application. The method can include associating, by the computer device, the cache lookup key with the one of the cache files.

In some embodiments, the method can include storing, by the computer device, a key identifier at the one of the cache files, address data for a trusted module, and the cache lookup key. The key identifier can correspond to the encryption key. The method can include providing, by the computer device, credentials to an authentication module of a server. The credentials can correspond to the user of the application. The method can include receiving, by the computer device responsive to an authentication performed by the authentication module of the server for the user of the application, permission to access to one or more resources provided through the server.

In embodiments, the method can include receiving, by the computer device, an indication from an authentication module of a server replace a pin associated with the user of the application. The method can include receiving, by the computer device from the authentication module, a second pin associated with the user of the application to replace a first pin associated with the user of the application. The second pin can be different from the first pin. The method can include retrieving, by the computer device from a trusted module, the encryption key using the pin associated with the user of the application. The method can include decrypting, by the computer device, the encrypted user data in the one of the cache files using the encryption key.

In some embodiments, the method can include transmitting, by the computer device, a request to a trusted module to generate a second encryption key using the second pin associated with the user of the application, the request including the second pin. The method can include encrypting, by the computer device, the user data in the one of the cache files using the second encryption key. The method can include updating, by the computer device, the one of the cache files at a cache database with the user data encrypted using the second encryption key.

In at least one aspect, this disclosure is directed to a system. The system can include a computer device comprising one or more processors coupled to memory. The computer device can be configured to generate cache files for a plurality of users of an application executable on the computing device. The cache files can store user data corresponding to individual users of the application. The computing device can be a shared computing device so that the cache files are viewable by the plurality of users using the computing device. The computer device can be configured to generate an encryption key for one of the cache files. The encryption key can be associated with a user of the application. The encryption key can be associated with a user identifier so that the encryption key is not accessible by other users of the computing device. The computer device can be configured to encrypt user data in one of the cache files with the encryption key. The computer device can be configured to present the encrypted user data to a user via the shared computing device based on receipt of the user identifier that enables access to the encryption key by the user. The encrypted user data can be presented without the encrypted user data or the encryption key of the user being accessible to other users of the shared computing device.

In embodiments, the computer device can be configured to receive, responsive to a prompt provided to the user of the application, a pin from the first user of the device and store, the encryption key using the pin in a trusted module. The pin can be used to retrieve the encryption key from the trusted module. The encryption key can be used to decrypt the encrypted user data in the one of the cache files.

In some embodiments, the computer device can be configured to generate a prompt for the user of the application through a browser of the computer device to request a pin. The computer device can be configured to receive, responsive to the prompt provided to the user of the application, the pin from the user of the application. The computer device can be configured to store the pin for the user of the application at an authentication module of the server. The computer device can be configured to generate a cache lookup key using the user identifier corresponding to the user of the application and associate the cache lookup key with the one of the cache files.

In at least one aspect, this disclosure is directed to a non-transitory computer-readable medium. The non-transitory computer-readable medium can include instructions that, when executed by the processor of a device, cause the processor to generate cache files for a plurality of users of an application executable on the computing device. The cache files can store user data corresponding to individual users of the application. The computing device can be a shared computing device so that the cache files are viewable by the plurality of users using the computing device. The non-transitory computer-readable medium can include instructions that, when executed by the processor of a device, cause the processor to generate an encryption key for one of the cache files. The encryption key can be associated with a user of the application, wherein the encryption key is associated with a user identifier so that the encryption key is not accessible by other users of the computing device. The non-transitory computer-readable medium can include instructions that, when executed by the processor of a device, cause the processor to encrypt user data in one of the cache files with the encryption key. The non-transitory computer-readable medium can include instructions that, when executed by the processor of a device, cause the processor to present the encrypted user data to a user via the shared computing device based on receipt of the user identifier that enables access to the encryption key by the user. The encrypted user data can be presented without the encrypted user data or the encryption key of the user being accessible to other users of the shared computing device.

In embodiments, the non-transitory computer-readable medium can include instructions that, when executed by the processor of a device, cause the processor to receive, responsive to a prompt provided to the user of the application, a pin from the first user of the device and store the encryption key using the pin in a trusted module. The pin can be used to retrieve the encryption key from the trusted module. The encryption key can be used to decrypt the encrypted user data in the one of the cache files.

In some embodiments, the non-transitory computer-readable medium can include instructions that, when executed by the processor of a device, cause the processor to generate a prompt for the user of the application through a browser of the computer device to request a pin. The non-transitory computer-readable medium can include instructions that, when executed by the processor of a device, cause the processor to receive, responsive to the prompt provided to the user of the application, the pin from the user of the application and store the pin for the user of the application at an authentication module of the server.

In at least one aspect, this disclosure is directed to a method for accessing cache data when a server is offline. The method can include receiving, by a client application executing on a device, a request to access one or more of a plurality of resources. The plurality of resources can be provided through a server. The method can include prompting, by the client application and responsive to a determination that the server is inaccessible from the device, the user of the client device to provide a user identifier and a pin. The user identifier and the pin can be unique to the user of the device. The method can include retrieving, by the client application, an encryption key from a trusted module using the pin and user data from a cache database using the user identifier. The user data can correspond to the user of the client device. The user data can be encrypted with the encryption key. The method can include decrypting, by the client application, the user data using the encryption key. The user data can include a list of resources and resource leases. The list of resources can include the one or more resources from the plurality of resources. Each of the resource leases can correspond to at least one resource from the list of resources. The method can include receiving, by the client application, a selection of a first resource of the list of resources from the user of the device. The first resource can correspond to at least one resource from the plurality of resources provided by the server. The method can include establishing, by the client application, a session to a resource server hosting the first resource using a first resource lease. The session can be established between the device and the resource server when the server is inaccessible from the device.

In embodiments, the method can include transmitting, by the client application, a request to the server for the list of resources the user of the device is permitted to access. The method can include determining, by the client application, that the server is inaccessible from the device. The method can include retrieving, by the client application, user data from an offline cache of the client device using the user identifier. The user data can correspond to the user of the client device. The method can include detecting, by the client application, a time out event of the session between the device and the resource server. The method can include removing, by the client application from the device, the pin corresponding to the user of the device and the user device corresponding to the user of the device.

The details of various embodiments of the disclosure are set forth in the accompanying drawings and the description below.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

FIGS. 3A-3F are a flow diagram of a method for securing and accessing offline data.

DETAILED DESCRIPTION

Figure 1A:
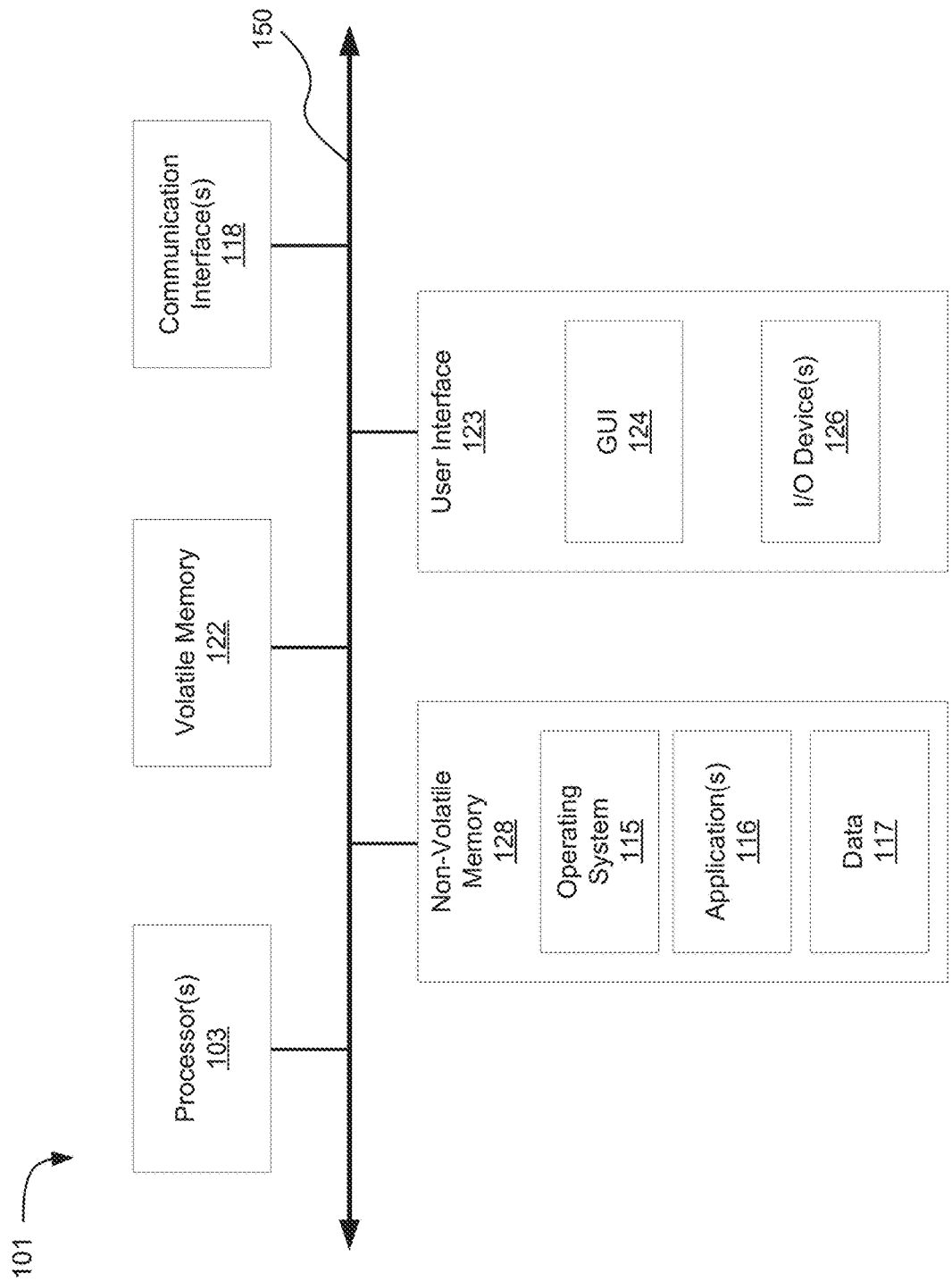
FIG. 1A is a block diagram of embodiments of a computing device.

For purposes of reading the description of the various embodiments below, the following descriptions of the sections of the specification and their respective contents may be helpful:

Organizations, networks or companies can provide a plurality of users shared access to different resources (e.g., applications, desktops and files) hosted in a cloud environment or other network accessible by each user of the respective organization. The users can access the resources using shared devices. For example, in embodiments, a user can authenticate to an authentication module or control server of the respective network and be provided a list of resources the respective user is permitted to access. The list of resources can be provided in a user interface through a browser of a client device. To access or connect to a resource, the user can select the respective resource from the list of resources and the control server can establish or broker a connection to the respective resource. For example, the control server can generate a connection lease (e.g., access lease, resource lease) and provide the lease to a client application executing on the client device. The client application can use the connection lease to connect to the resource without repeating authentication to the authentication module or control server for the duration of the connection lease. Thus, to connect to a resource, the client application can obtain the connection lease from the control server and connect to the resource. However, if the control server is unreachable or inaccessible (e.g., offline) from the client device for any resource, the user cannot access the connection lease and therefore, cannot connect to the resource even if the resource is accessible or connectable from the client application executing on the client device because the connection lease cannot be obtained. This can diminish or otherwise adversely impact the user experience of the client application because the user is unable to access particular applications when they need to do so. Thus, users of client devices can be frustrated in their attempts to access client applications to perform one or more desired tasks. This situation is particularly troublesome when the user wants to accomplish time-sensitive tasks, such as signing or approving documents, using the client device.

Some applications provide access to cache resource assets and user data in browser local storage so that a user can access the respective resource when a server (e.g., control server) hosting the resource is unreachable or inaccessible. However, the browser local storage is accessible to multiple different users of a shared device and thus not secure or protected from unauthorized access. Users may not be required to log in to a shared client device. Thus, any user that accesses the shared client device can also access the same browser offline data. Such applications are undesirable for handling or otherwise processing sensitive data because there is a high risk that data can be stolen by unauthorized users when using these applications.

Therefore, systems and methods described herein provide segregation and encryption of user data so that each user can only access the data they are entitled to or that corresponds to the respective user. For example, systems and methods described herein provide segregation and secure encryption of browser offline data for different users of a shared device in an offline cache (e.g., cache database) accessible by a client device of a user. The user can access the segregated user data in the offline cache to access to a plurality of resources when the server (e.g., control server) hosting the application is unreachable or inaccessible. For example, user data can be indexed based in part on the associated user and encrypted prior to being stored in an offline cache. The encryption key used to encrypt the user data can be unique to each user and secured by a pin provided by the associated user such that each user has a unique pin. The offline cache can be stored at the client device or a device accessible by the client device such that a client application executing on the client device can access the offline cache to connect to one or more resources for a user of the client device when the server (e.g., control server) hosting the resource is unreachable or inaccessible. In embodiments, users of a client device can access a plurality of resources through a client application on the client device when a control server and/or public cloud is not accessible from the client device by accessing the encrypted user data in the offline cache and establishing a connection to one or more resources through the client application executing on the client device.

Section A describes a computing environment which may be useful for practicing embodiments described herein; and Section B describes methods and systems for securing offline data for shared accounts.

A. Computing Environment

Prior to discussing the specifics of embodiments of the systems and methods of for securing offline data (e.g., browser offline data) for shared accounts, it may be helpful to discuss the computing environments in which such embodiments may be deployed.

As shown in FIG. 1A, computer 101 may include one or more processors 103, volatile memory 122 (e.g., random access memory (RAM)), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, one or more accelerometers, etc.). Non-volatile memory 128 stores operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computer 101 may communicate via one or more communication buses, shown as communication bus 150.

Computer 101 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 118 may include one or more interfaces to enable computer 101 to access a computer network such as a Local Area Network (LAN), a Wide Area Network (WAN), a Personal Area Network (PAN), or the Internet through a variety of wired and/or wireless or cellular connections.

In described embodiments, the computing device 101 may execute an application on behalf of a user of a client computing device. For example, the computing device 101 may execute a virtual machine, which provides an execution session within which applications execute on behalf of a user or a client computing device, such as a hosted desktop session. The computing device 101 may also execute a terminal services session to provide a hosted desktop environment. The computing device 101 may provide access to a computing environment including one or more of: one or more applications, one or more desktop applications, and one or more desktop sessions in which one or more applications may execute.

Additional details of the implementation and operation of network environment, computer 101 and client and server computers may be as described in U.S. Pat. No. 9,538,345, issued Jan. 3, 2017 to Citrix Systems, Inc. of Fort Lauderdale, Fla.

Figure 1B:
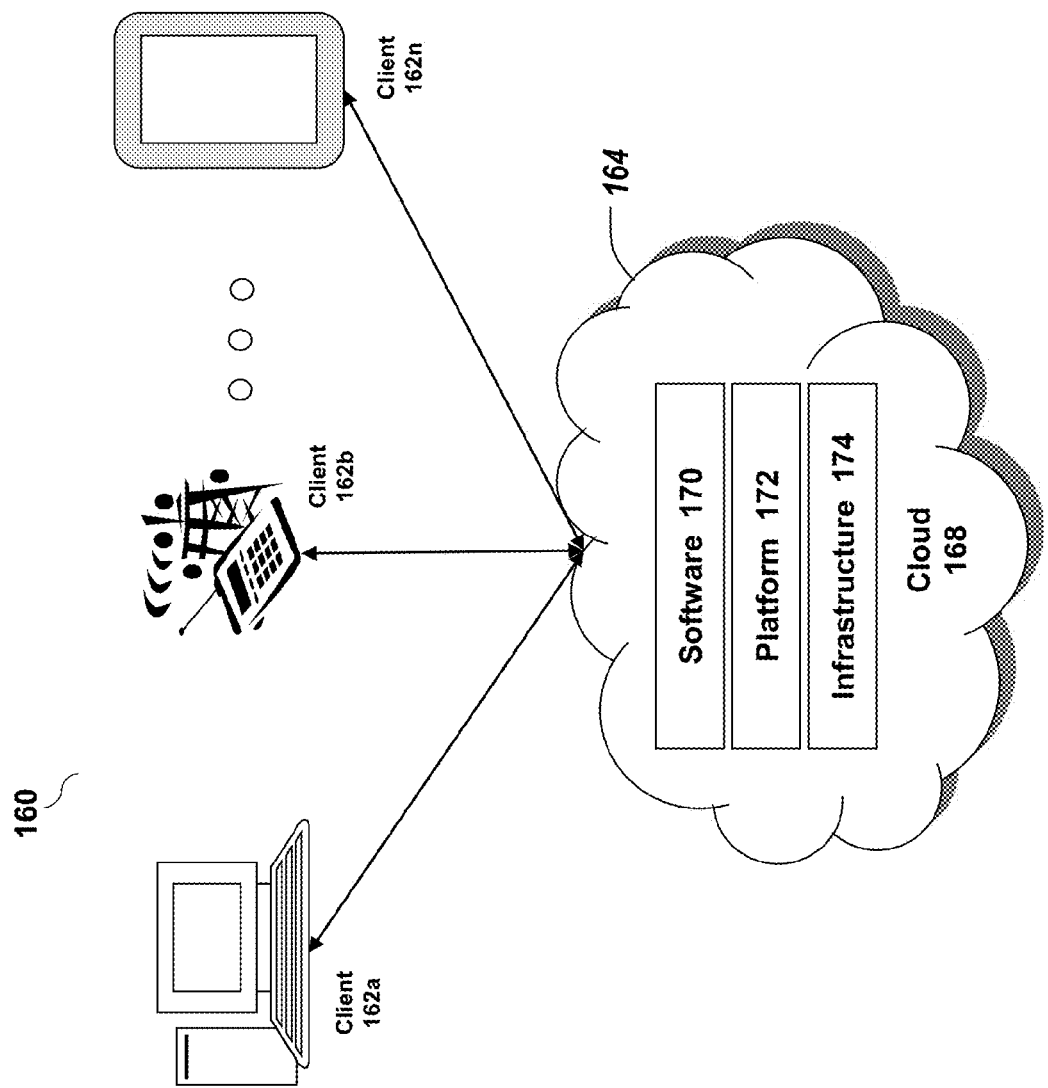
FIG. 1B is a block diagram depicting a computing environment comprising client device in communication with cloud service providers.

Referring to FIG. 1B, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers, processing, memory, storage, applications, virtual machines, databases, software, hardware, analytics, and intelligence.

In embodiments, the computing environment 160 may provide client 162 with one or more resources provided by a network environment. The computing environment 162 may include one or more clients 162a-162n, in communication with a cloud 168 over one or more networks 164. Clients 162 may include, e.g., thick clients, thin clients, and zero clients. The cloud 108 may include back end platforms, e.g., servers 106, storage, server farms or data centers. The clients 162 can be the same as or substantially similar to computer 101 of FIG. 1A.

The users or clients 162 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 108 may be public, private, or hybrid. Public clouds 108 may include public servers that are maintained by third parties to the clients 162 or the owners of the clients 162. The servers may be located off-site in remote geographical locations as disclosed above or otherwise. Public clouds 168 may be connected to the servers over a public network 164. Private clouds 168 may include private servers that are physically maintained by clients 162 or owners of clients 162. Private clouds 168 may be connected to the servers over a private network 164. Hybrid clouds 168 may include both the private and public networks 164 and servers.

The cloud 168 may include back end platforms, e.g., servers, storage, server farms or data centers. For example, the cloud 168 can include or correspond to a server or system remote from one or more clients 162 to provide third party control over a pool of shared services and resources. The computing environment 160 can provide resource pooling to serve multiple users via clients 162 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 162. The computing environment 160 can provide an elasticity to dynamically scale out or scale in responsive to different demands from one or more clients 162. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include serverless computing. The computing environment 160 can include Software as a service (SaaS). For example, the cloud 168 may also include a cloud based delivery, e.g. Software as a Service (SaaS) 170, Platform as a Service (PaaS) 172, and Infrastructure as a Service (IaaS) 174. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 162 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 162 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 162 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 162 may also access SaaS resources through smartphone or tablet applications, including, e.g., Salesforce Sales Cloud, or Google Drive app. Clients 162 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

B. Securing Offline Data

Systems and method for segregating and encryption offline data are provided herein. In embodiments, a cache file can be created for each user to store and encrypt the user data separately for each user using a shared device. A shared device can include a device or desktop accessible by multiple different users. For example, a shared device (e.g., shared resource) can include a device used by two or more different users. A shared device can include a device or computer resource made available to multiple different users on a network. In one embodiment, a shared device can include a work device or work resource accessible by multiple different employees with each of the different employees having a different user profile or user credentials to log on and access the resources of the respective shared device. The user data in the cache file can be encrypted using an encryption key generated uniquely for the user. The user can provide a pin to secure and protect the encryption key. The encrypted user data in the cache file and the encryption key can be stored in an offline cache on the device of the user or on a device accessible (e.g., shared resources, shared files, shared folders, shared printers) by the device of the user. Thus, users can access the encrypted user data when a server hosting a plurality of resources is offline or inaccessible from the device of the user. For example, a client application executing on the device of the user can access the encrypted user data to provide access the one or more resources (e.g., applications, desktops, files) for the user of the device when the hosting server or hosting cloud environment is not accessible from the device of the user. For example, not accessible can include, but not limited to, being unable to establish a connection to the server or cloud environment, unable to access resources provided by the server or cloud environment, or denied access to the resources provided by the server or cloud environment. The encryption key and pin can be unique to each user and be used to segregate access to the cached data to each user of the shared device, such that a user can access the cache data they have permission to access.

Figure 2:
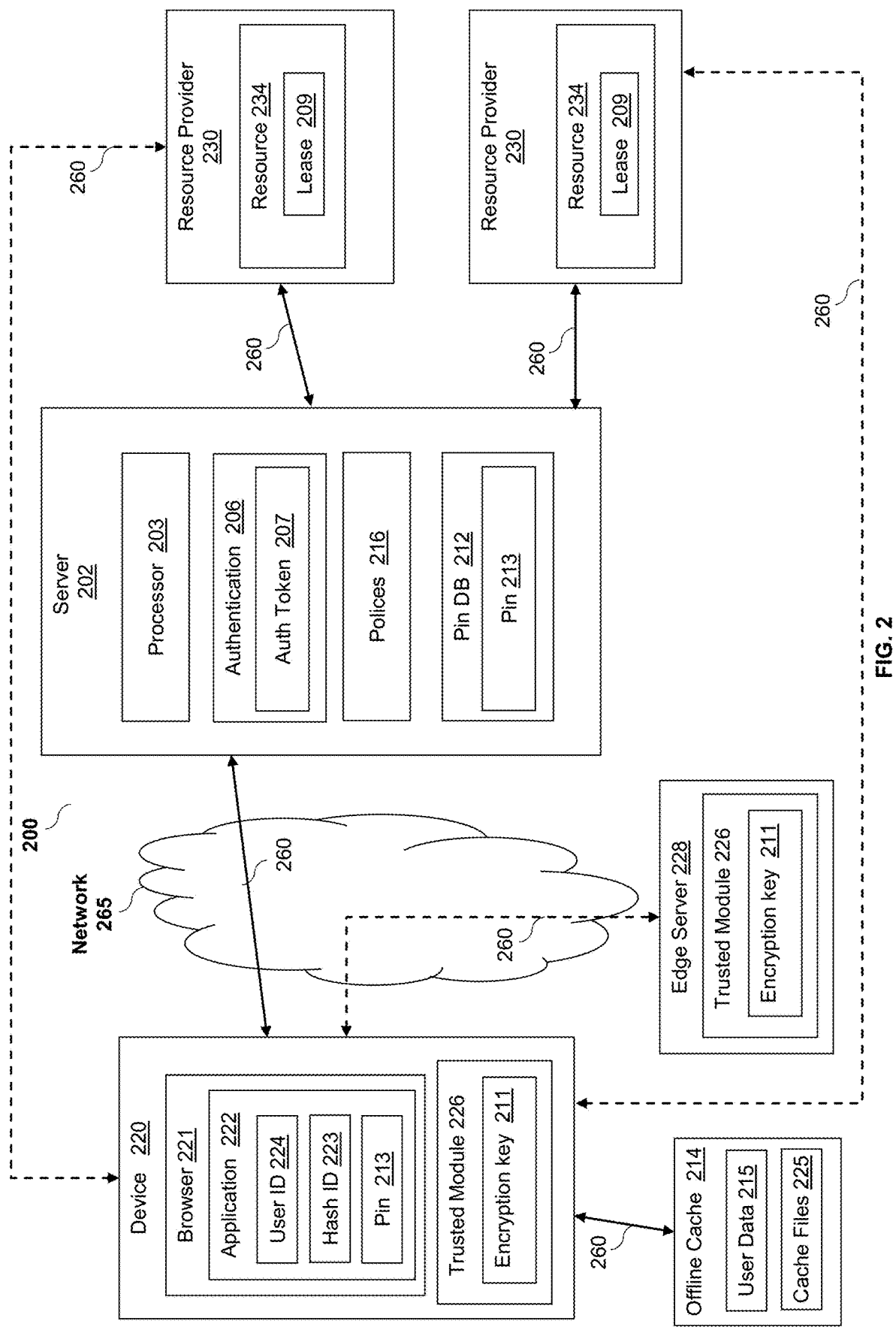
FIG. 2 is a block diagram of a system for securing offline data.
Figure 3A:
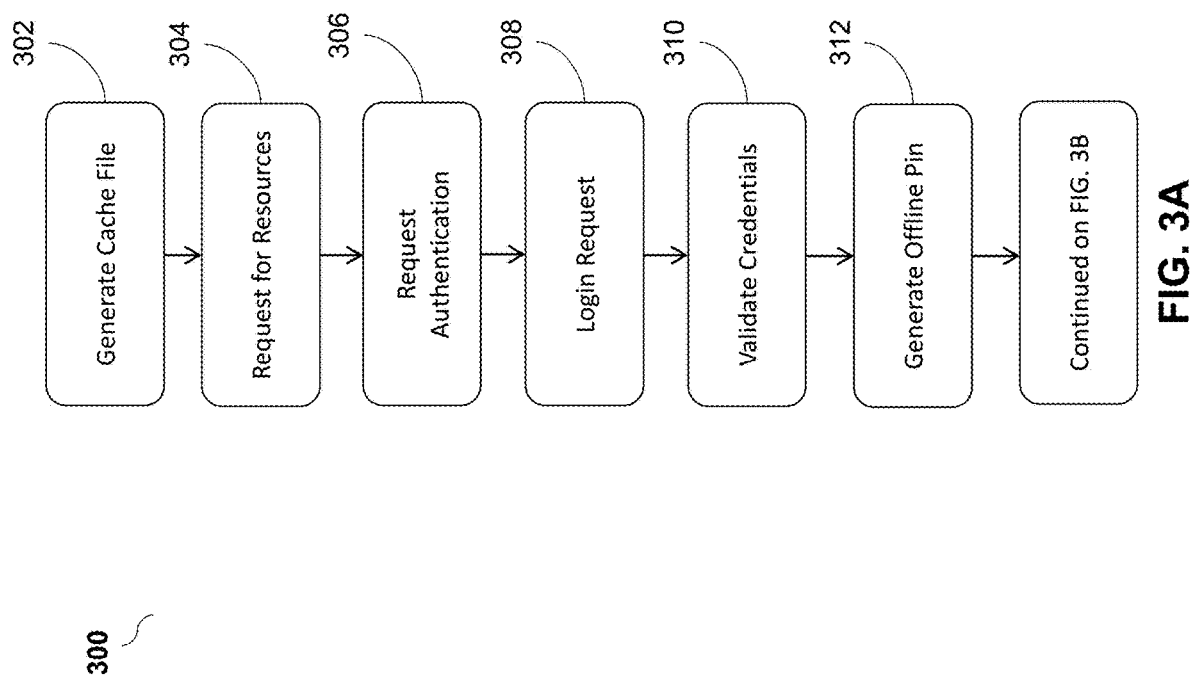
Figure 3B:
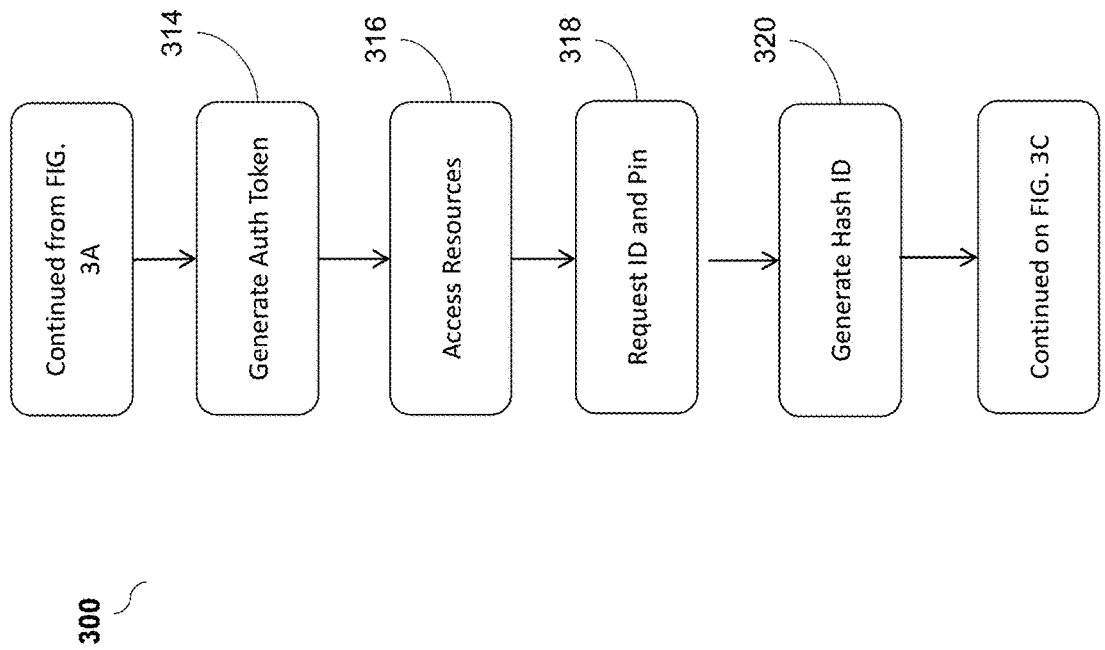
Figure 3C:
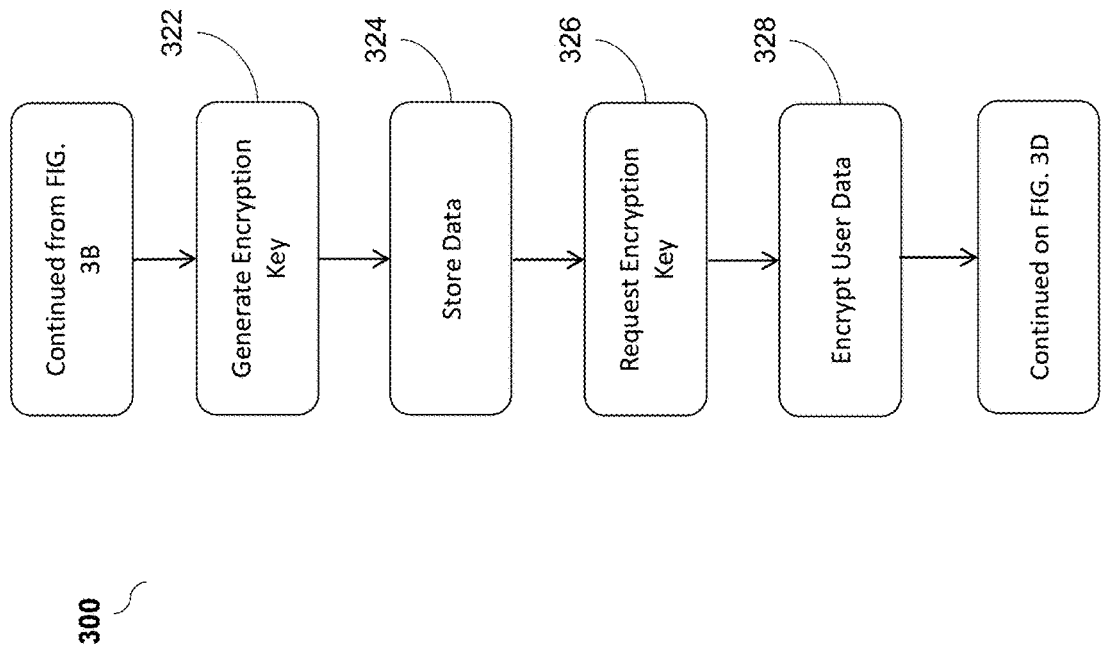
Figure 3D:
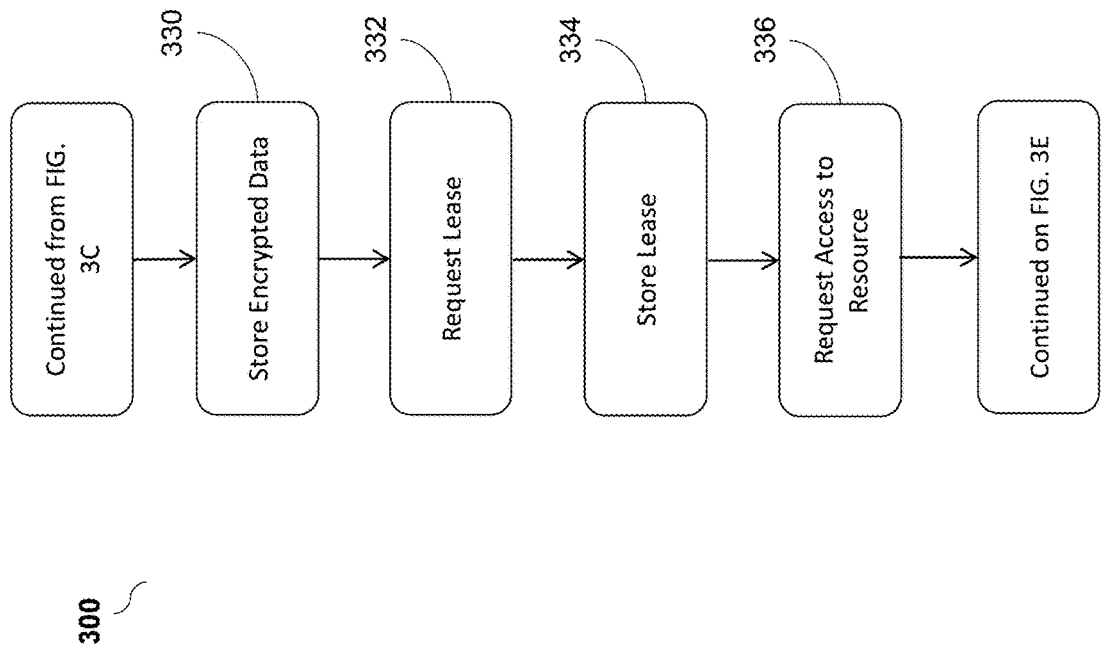
Figure 3F:
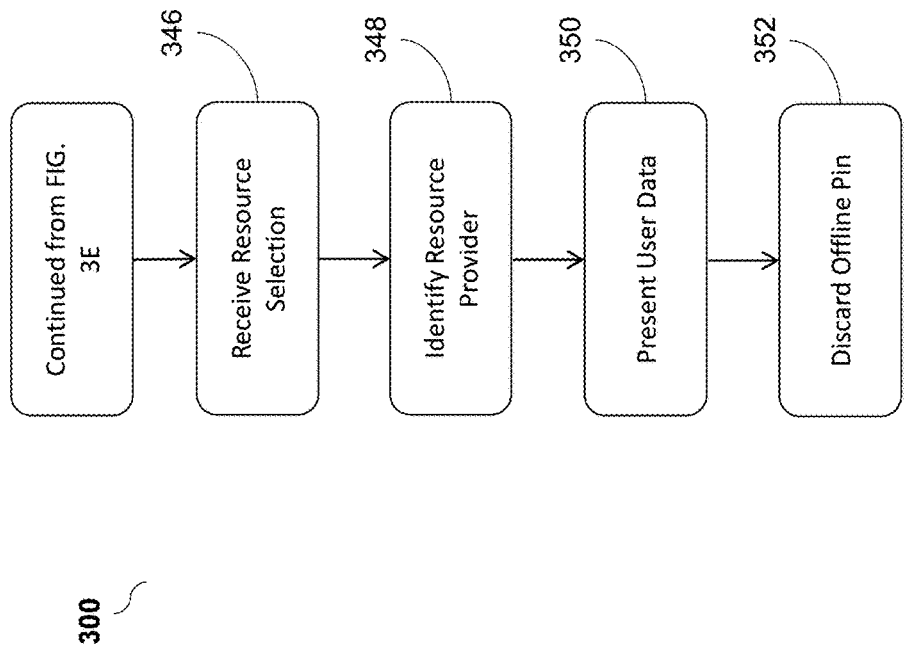

Referring to FIG. 2, depicted is a block diagram of one embodiment of an environment 200 having a server 202 (e.g., workspace server) providing access to a plurality of resources 234 for one or more devices 220. The server 202 can broker and provide access to different resources 234 responsive to authenticating the respective device 220. In some embodiments, the server 202 can be a workspace platform server or traffic management server configured to control access to the different resources 234 of the environment 200.

The server 202 can be implemented using hardware or a combination of software and hardware. For example, each component of the server 202 can include logical circuitry (e.g., a central processing unit or CPU) that responses to and processes instructions fetched from a memory unit (e.g., pin database 212). Each component of the server 202 can include or use a microprocessor or a multi-core processor. A multi-core processor can include two or more processing units on a single computing component. Each component of the server 202 can be based on any of these processors, or any other processor capable of operating as described herein. Each processor can utilize instruction level parallelism, thread level parallelism, different levels of cache, etc. For example, the server 202 can include at least one logic device such as a computing device or server having at least one processor to communicate via a network 265. The components and elements of the server 202 can be separate components or a single component. The server 202 can include a memory component to store and retrieve data. The memory can include a random access memory (RAM) or other dynamic storage device, coupled with the pin database 212 for storing information, and instructions to be executed by the server 202. The memory can include at least one read only memory (ROM) or other static storage device coupled with the pin database 212 for storing static information and instructions for the server 202. The memory can include a storage device, such as a solid state device, magnetic disk or optical disk, coupled with the pin database 212 to persistently store information and instructions.

The server 202 can include a processor 203. The processor 203 can include non-volatile memory that stores computer instructions and an operating system. For example, the computer instructions can be executed by the processor 203 out of volatile memory to perform all or part of the method 300 and/or method 400. In some embodiments, the server 202 can include a non-transitory computer-readable medium, comprising instructions that, when executed by the processor of the server 202, cause the processor to perform all or part of the method 300 and/or method 400. The processor 203 can include or execute policies 216 or rules for the server 202. The processor 203 can include a database and be configured to generate and/or store authentication credentials for one or more devices 220. In some embodiments, the processor 203 can couple with and interact with an authentication module 206 executing on server 202 to validate and authenticate credentials received from one or more devices 220. The processor 203 can couple with and interact with the authentication module 206 to generate authentication tokens 207 responsive to validating credentials received from one or more devices 220. The processor 203 can store the user data 215 corresponding to one or more users of one or more devices 220 in a cache database 214. In some embodiments, the processor 203 can be configured to provide enforcement support for connections 260 between the server 202 and one or more devices 220. The processor 203 can include non-volatile memory that stores computer instructions and an operating system. For example, the computer instructions can be executed by the processor 203 out of volatile memory to perform all or part of the method 300. The server 202 can include a non-transitory computer-readable medium that includes instructions that, when executed by the processor 203 of the server 202 cause the processor 203 to execute or perform the functionalities of the method 300.

The server 202 can include an authentication module 206. The authentication module 206 can include a database and be configured to generate and/or store authentication credentials for a user of a device 220 and/or a device 220. The authentication module 206 can validate and authenticate a user of a device 220 and/or a device 220 responsive to receiving credentials from the respective user of a device 220 and/or a device 220. The authentication module 206 can generate authentication tokens 207 responsive to validating credentials from a user of a device 220 and/or a device 220. The authentication tokens 207 can indicate that the respective user of the device 220 and/or device 220 has been authenticated and can be given access to server 202 and/or one or more resources 234. The authentication tokens 207 can indicate that the respective user of at least one application 222 executing on at least one device 220 has been authenticated and can be given access to server 202 and/or one or more resources 234. In some embodiments, the authentication module 206 can receive the authentication credentials from an authentication module 206 coupled with the server 202 and store the authentication credentials responsive to receiving them.

The server 202 can include and/or generate a plurality of policies 216 (e.g., access policies) to apply to connections 260 established between a device 220 and the server 202 and/or a resource provider 230. For example, the processor 203 configured to apply policies 216 to selectively allow or block connections 260 between a device 220 and the server 202 and/or a resource provider 230. In embodiments, the policies 216 can be used to control access to a resource 234 and/or resource provider 230. The policies 216 can be used to control a level of access to a resource 234 and/or a resource provider 230. In some embodiments, the policies 216 can be used to manage and/or allocate bandwidth for a connection 260 between a device 220 and the server 202 and/or a resource provider 230. The processor 203 can apply policies 216 to a user of a device 220 and/or a device 220 to allow (e.g., permit) access to a resource 234 and/or resource provider 230 based in part on credentials provided by the respective user and/or device 220. In some embodiments, the processor 203 can make a determination on the resources 234, number of resources 234, and/or type of resources 234 a user is permitted to access responsive to an authentication of the user via an authentication module 206.

The policies 216 can include threshold polices. For example, the processor 203 can apply the polices 216 to connections 260 established for a user and/or device 220 that exceed a login threshold or time period threshold. The processor 203 can determine that the user of the device 220 has exceeded a threshold and needs to change or update the pin 213 corresponding to the respective user. The policy 216 or threshold can be configurable by each customer, organization or network. In some embodiments, the processor 203 can apply the polices 216 for balancing load, bandwidth data, usage data and/or traffic routing data within the environment 200.

The server 202 can include a pin database 212 (e.g., offline pin database) to store one or more pins 213 (e.g., offline pins) received from and/or generated for one or more users. The pin database 212 can be implemented using hardware or a combination of software and hardware. For example, each component of the pin database 212 can include logical circuitry (e.g., a central processing unit or CPU) that responses to and processes instructions fetched from a memory unit. Each component of the pin database 212 can include or use a microprocessor or a multi-core processor. A multi-core processor can include two or more processing units on a single computing component. Each component of the pin database 212 can be based on any of these processors, or any other processor capable of operating as described herein. Each processor can utilize instruction level parallelism, thread level parallelism, different levels of cache, etc. For example, the pin database 212 can include at least one logic device such as a computing device or server having at least one processor to communicate via a network 265. The components and elements of the pin database 212 can be separate components or a single component. For example, the pin database 212 can include combinations of hardware and software, such as one or more processors configured to initiate stop commands, initiate commands, and transmit or receive pins 213, for example. The pin database 212 can include a structured set of data stored for the server 202. For example, the pin database 212 can include a plurality of entries or storage locations to store pins 213 for a plurality of users of one or more devices 220. The pin database 212 can include a memory component to store and retrieve data, such as, pins 213. The memory can include a random access memory (RAM) or other dynamic storage device, coupled with the pin database 212 for storing information, and instructions to be executed by the server 202. The memory can include at least one read only memory (ROM) or other static storage device coupled with the pin database 212 for storing static information and instructions for the server 202. The memory can include a storage device, such as a solid state device, magnetic disk or optical disk, coupled with the pin database 212 to persistently store information and instructions.

The device 220 and/or the edge server 228 can include a trusted module 226. The trusted module 226 can include or correspond to a smartcard or secure hardware executing on the device 220 and/or the edge server 228. For example, the trusted module 226 can include a chip configured to generate and store encryption keys 211. The trusted module 226 can implemented using hardware or a combination of software and hardware. For example, each component of the trusted module 226 can include logical circuitry (e.g., a central processing unit or CPU) that responses to and processes instructions fetched from a memory unit. Each component of the trusted module 226 can include or use a microprocessor or a multi-core processor. A multi-core processor can include two or more processing units on a single computing component. The trusted module 226 can include a memory component to generate, store and retrieve data, such as, encryption keys 211. The memory can include a random access memory (RAM) or other dynamic storage device, coupled with the trusted module 226 for storing information, and instructions to be executed by the device 220 and/or the edge server 228. The memory can include at least one read only memory (ROM) or other static storage device coupled with the trusted module 226 for storing static information and instructions for the device 220 and/or the edge server 228. The memory can include a storage device, such as a solid state device, magnetic disk or optical disk, coupled with the trusted module 226 to persistently store information and instructions. In some embodiments, the trusted module 226 can correspond to a server or trusted server communicatively coupled with the device 220 and/or the edge server 228.

The resource providers 230 can correspond to remote servers or third party servers to host or provide one or more resources 234. The resources 234 can include applications, desktops, and or files. For example, the resources 234 can include, but not limited to, virtual desktops, virtual applications, SaaS applications, web applications, mobile applications, and other forms of content. The resource providers 230 can include or correspond to internal servers or internal clouds that are part of the same environment 200 as the server 202 and provide internal resources 234 to one or more users of the environment 200. In some embodiments, the resource providers 230 can include or correspond to external servers coupled with the server 202 through one or more networks 265 to provide resources 234 to one or more users of the environment 200. The resource providers 230 can generate one or more connection leases 209. For example, the resource providers 230 can generate at least one connection lease 209 for each resource 234. In some embodiments, the connection lease 209 can correspond to a digitally signed agreement or assertion that a respective user of a device 220 has been authenticated and given access to a corresponding resource 234 such that the respective user can provide the connection lease 209 via a client application 222 executing on a device 220 to gain access to the corresponding resource 234. The connection lease 209 (e.g., resource lease) can be used by a device 220 or client application 222 executing on a device 220 to provide access to a corresponding resource 234 for a user of the device 220. The connection lease 209 can be used once to provide access to a corresponding resource 234 for a user of the device 220. The connection lease 209 can be used multiple times (e.g., two or more) to provide access to a corresponding resource 234 for a user of the device 220. For example, in some embodiments, the connection lease 209 can be generated having a time duration such that when the time duration expires for a connection lease 209, the connection lease 209 may no longer be used to access a resource 234. In embodiments, the resource providers 230 can include at least one logic device such as a computing device or server having at least one processor to communicate via a network 265. The resource providers 230 can include or establish at least one connection 260 to a device 220 or to a server 202 to provide access to one or more resources 234 hosted by or provided by the respective resource provider 230.

The server 202 can be coupled with at least one edge server 228 via network 265. The edge server 228 can correspond to a remote server or third party server to generate, provide and/or store encryption keys 211 for one or more users. The edge server 228 can provide a connection or an entry point for device 220 to access network 104 and server 202. In some embodiments, the edge server 228 can correspond to a secure edge server. For example, access to the edge server 228 and/or one or more files or databases (e.g., trusted module 226) can be password protected or encrypted. In embodiments, the edge server 228 can reside within the same network 265 as the devices 220 and/or server 202. In some embodiments, the environment 200 can include multiple edge servers 228. For example, at least one edge server 228 can be assigned or allocated to generate, provide and/or store encryption keys for each device 220 (e.g., each customer, client) of the respective environment 200. The edge server 228 can include a database to store encryption keys 211. The edge server 228 can include a smartcard, chip or secure hardware to store encryption keys 211 for one or more users. The edge server 228 can include hardware or a combination of software and hardware. For example, each component of the edge server 228 can include logical circuitry (e.g., a central processing unit or CPU) that responses to and processes instructions fetched from a memory unit. Each component of the edge server 228 can include or use a microprocessor or a multi-core processor. A multi-core processor can include two or more processing units on a single computing component. The edge server 228 can include a memory component to generate, store and retrieve data, such as, encryption keys 211. The memory can include a random access memory (RAM) or other dynamic storage device, coupled with the edge server 228 for storing information, and instructions to be executed by the server 202. The memory can include at least one read only memory (ROM) or other static storage device coupled with the edge server 228 for storing static information and instructions for the server 202. The memory can include a storage device, such as a solid state device, magnetic disk or optical disk, coupled with the edge server 228 to persistently store information and instructions.

The device 220 can be a client device, such as, but not limited to a computing device or a mobile device. The device 220 can include or correspond to an instance of any client device, mobile device or computer device described herein. For example, the device 220 can be the same as or substantially similar to computer 101 of FIG. 1A. In embodiments, the device 220 can include one or more processors 203 coupled to a memory to perform all or part of the method 300 and/or method 400. For example, the device 220 can include at least one processor (e.g., processor 103 of FIG. 1A) that can include non-volatile memory that stores computer instructions and an operating system. The computer instructions can be executed by the processor out of volatile memory to perform all or part of the method 300 and/or method 400. In some embodiments, the device 220 can include a non-transitory computer-readable medium, comprising instructions that, when executed by the processor of the device 220, cause the processor to perform all or part of the method 300 and/or method 400. The device 220 can couple with the server 202 through network 265. The device 220 can include a browser 221 for accessing, downloading or interacting with a resource 234. For example, the browser 221 can couple with the server 202 or resource provider 230 to access at least one resource 234 hosted or provided by a resource provider 230. In some embodiments, the browser 221 can include a CEB (e.g., client embedded browser). For example, the browser 221 can be referred to as an embedded browser, and the client application with embedded browser (CEB) is sometimes referred to as a workspace application. The client application 222 can establish a secure connection to the server 202 to provide access to at least one resource 234 for the user to access using the device 220 and the embedded browser 221. In embodiments, the embedded browser 221 can be integrated with the client application 222 to ensure that traffic related to the resource 234 is routed through and/or processed in the client application 222, which can provide the client application 222 with real-time visibility to the traffic (e.g., when decrypted through the client application), and user interactions and behavior. The browser 221 can include elements and functionalities of a web browser application or engine. The browser 221 can locally render one or more resources 234 or content associated with a resource 234 for the device 220.

The device 220 can execute or run a client application 222. For example, the client application 222 can execute or run within the browser 221. The client application 222 can be configured to couple with the server 202 or resource provider 230 to access at least one resource 234 hosted or provided by a resource provider 230. For example, the client application 222 can establish or broker a connection 260 between the device 220 and the server 202 and/or one or more resource providers 230 to access at least one resource 234. The client application 222 can establish or broker a connection 260 between the device 220 and one or more resource providers 230 to access at least one resource 234 when the server 202 is offline, unavailable or otherwise inaccessible from the device 220. In some embodiments, the client application 222 can interact with a cache database 214 to provide offline access to one or more resources 234 for the device 220. For example, the client application 222 can retrieve user data 215 and cache files 225 from the cache database 214. The client application 222 can provide the user data 215 and cache files 225 to a user of the device 220 through the browser 221 of the device 220. In embodiments, the client application 222 can include one or more processors coupled to a memory to perform all or part of the method 300 and/or method 400. For example, the client application 222 can include at least one processor (e.g., processor 103 of FIG. 1A) that can include non-volatile memory that stores computer instructions and an operating system. The computer instructions can be executed by the processor out of volatile memory to perform all or part of the method 300 and/or method 400. In some embodiments, the client application 222 can include a non-transitory computer-readable medium, comprising instructions that, when executed by the processor of the client application 222, cause the processor to perform all or part of the method 300 and/or method 400.

The client application 222 (e.g., computing device) can receive, store and/or generate a user identifier 224 (user ID 224), a hash ID 223, and/or a pin 213 for a user of a device 220. For example, the user ID 224 can include a unique identifier corresponding to a respective user. The user ID 224 can be used to identify and distinguish the user when the user accesses the device 220 from a different user. For example, a user ID 224 can be uniquely generated for each user such that no two users have the same user ID 224. The user ID 224 can include a numerical identifier, alphabetic identifier, alphanumeric identifier generated for a respective user. In some embodiments, the user ID 224 can correspond to an employment or organization identifier assigned to the respective user.

The client application 222 can generate a hash ID 223 for the user based in part on the user ID 224 of the user. The hash ID 223 can be used to index, segregate or otherwise separate user data corresponding to different users. For example, the hash ID 223 can be used to index, segregate or otherwise separate user data 215 for a first user from user data 215 from a second, different users. For example, the hash ID 223 can correspond to a hash of the user ID 224 and a tenant ID corresponding to the user. The tenant ID can include an identifier for a group or users or an organization that the first user is a part of or included within. For example, in one embodiments, the tenant ID can include an identifier for an organization the first user works for. The hash ID 223 can include a numerical identifier, alphabetic identifier, alphanumeric identifier generated for a respective user. The client application 222 can generate a unique hash ID 223 for each user of the plurality of users. In embodiments, the hash ID 223 can correspond to or be referred to herein as a cache lookup key. For example, the hash ID 223 can be used to lookup and identify at least one cache file 225 stored in an offline cache 214 associated with a respective user. The cache files 225 can be stored in the offline cache 214 using a hash ID 223. Thus, the hash ID 223 for a first user can be used to retrieve at least one cache file 225 associated with the first user and stored in the offline cache 214. The client application can receive and/or generate a pin 213 for a respective user. The pin 213 can be used to protect and secure an encryption key 211 generated for a user of the device 220. For example, the pin 213 can be used by the client application 222 to retrieve or otherwise access an encryption key 211 generated for a user and used to encrypt the user data 215 corresponding to the respective user. Each user can generate and provide a unique pin 213 such that no two users have the same pin 213 as will be described in more detail in regard to FIG. 4. The pin 213 can include a numerical identifier, alphabetic identifier, alphanumeric identifier generated for a respective user.

A cache database 214 can couple with or be a component of device 220. For example, the cache database 214 can be accessible from device 220 when the server 202 is offline, unavailable or otherwise inaccessible from the device 220. In some embodiments, the cache database 214 can include a browser cache to store data or content accessed by or interacted with by the browser 221 and/or client application 222 executing on the device 220. The cache database 214 can include a database to store user data 215 and pins 213. The cache database 214 can include hardware, software or a combination of hardware and software to store data for a device 220 and/or server 202. For example, each component of the cache database 214 can include logical circuitry (e.g., a central processing unit or CPU) that responds to and processes instructions fetched from a memory unit. Each component of the cache database 214 can include or use a microprocessor or a multi-core processor. A multi-core processor can include two or more processing units on a single computing component. The cache database 214 can include a memory component to generate, store and retrieve data, such as, user data 215 and pins 213. The memory can include a random access memory (RAM) or other dynamic storage device, coupled with the cache database 214 for storing information, and instructions for device 220 and/or client application 222. The memory can include at least one read only memory (ROM) or other static storage device coupled with the cache database 214 for storing static information and instructions for the device 220 and/or client application 222. The memory can include a storage device, such as a solid state device, magnetic disk or optical disk, coupled with the cache database 214 to persistently store information and instructions.

User data 215 can be generated by a user during a session with at least one resource 234. The user data 215 can correspond to data generated responsive to a user executing at least one resource 234 through device 220. For example, the user data 215 can include session data from at least one session with at least one resource 234 hosted or provided by at least one resource provider 230. In embodiments, the user data 215 can include cache data or browser cache data generated during a session (e.g., previous session) with a resource 234 by at least one user of the device 220. The user data 215 can include, but not limited to, one or more key IDs corresponding to one or more encryption keys 211 generated for one or more users of a device 220, address information for a trusted module 226, address information for an edge server 228, a hash ID 223, a cache file 225, and/or one or more connection leases 209.

The cache database 214 can store the user data 215 in segregated or separate entries (e.g., cache files 225) based on a user the user data 215 corresponds to. The cache files 225 can be segregated such that only the respective user that generated the user data 215 stored in the cache file 225 can access the cache file 225. The cache files 215 can be segregated such that the respective cache file 225 may only be accessible to a user having the pin 213 unique to the respective user that generated the user data 215 stored in the cache file 225. For example, the data in the cache file 225 can be encrypted and decrypted using the encryption key 211 and the encryption can be accessed or retrieved using the pin 213, thus the respective cache file 225 may only be accessible to a user having the pin 213. In embodiments, the cache files 225 can correspond to at least one entry or memory location within the cache database 214. For example, at least one entry or memory location within the cache database 214 can be unique to a user of a device 220 such that user data 215 for the corresponding user is stored in the corresponding entry or memory location (e.g., cache file 225). The cache database 214 can include a plurality of entries or memory locations that are segregated based on a specific user such that the user data for the respective user is segregated and separated from other entries or user data for other users of the respective device 220. Thus, the cache database 214 can provide segregation of encrypted user data 215 for different users of a shared device 220 or shared operating system account accessible through a shared device 220.

The connections 260 can correspond to or be used to establish an application session, an execution session, a desktop session, a hosted desktop session, a terminal services session, a browser session, a remote desktop session, a URL session and/or a remote application session. The connections 260 may include encrypted and/or secure sessions established between a device 220 and the server 202 and/or resource provider 230. For example, a connection 260 may include an encrypted session and/or a secure session established between a device 220 and the server 202 and/or resource provider 230. The encrypted connection 260 can include an encrypted file, encrypted data or traffic transmitted between a device 220 and the server 202 and/or resource provider 230.

Network 265 may be a public network, such as a wide area network (WAN) or the Internet. In some embodiments, network 265 may be a private network such as a local area network (LAN) or a company Intranet. Network 265 may be a public network, such as a wide area network (WAN) or the Internet. Network 265 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, devices 220, server 202 and resource providers 230 may be on the same network 265. In some embodiments, one or more of devices 220, server 202 and resource providers 230 may be on different networks 265. The network 265 can include a virtual private network (VPN). The VPN can include one or more encrypted connections 260 from a device 220 to the server 202 and/or resource provider 230 over network 265 (e.g., internet, corporate network, private network).

Each of the above-mentioned elements or entities is implemented in hardware, or a combination of hardware and software, in one or more embodiments. Each component of the server 202 may be implemented using hardware or a combination of hardware or software detailed above in connection with FIG. 1A. For instance, each of these elements or entities can include any application, program, library, script, task, service, process or any type and form of executable instructions executing on hardware of a client device (e.g., the device 220). The hardware includes circuitry such as one or more processors in one or more embodiments.

Referring now to FIGS. 3A-3F, depicted is a flow diagram of one embodiment of a method 300 for securing and accessing offline data. The functionalities of the method 300 may be implemented using, or performed by, the components detailed herein in connection with FIGS. 1A-2. In embodiments, method 300 can include methods for generating a pin 213, generating an encryption key 211, encrypting user data 215, and/or providing offline access to one or more resources 234.

Referring now to operation (302), and in some embodiments, at least one cache file 225 can be generated for a user of a device 220. In embodiments, a client application 222 executing on a device 220 (e.g., computing device 220) can generate cache files 225 for a plurality of users of one or more applications 222 executable on the device 220. The cache files 225 can store user data 215 corresponding to individual users of the application 222. In some embodiments, at least one cache file 225 can be generated for each individual user of the application 222. The cache files 225 can be generated to segregate or separately store user data 215 from different users of the device 220. For example, user data 215 can be stored in a first cache file 225 and user data 215 associated with a second user can be stored in a second cache file 225, different from the first cache file 225. In embodiments, at least one entry within the cache database 214 can be unique to a user of a device 220 such a pin 213 unique or personal to the respective user is needed to access to the respective entry (e.g., cache file 225). The cache database 214 can include a plurality of entries or memory locations that are accessible only though a unique pin (e.g., pin 213) provided by and generated by the user that generated the user data 215 stored in the respective entry of the cache database. In embodiments, the device 220 can correspond to or include a shared computing device (e.g., a device, desktop, resource or application accessible by multiple different users) shared by the plurality of users and the cache files 225 can be viewable by the plurality of users using the device 220 if not protected, for example, by a pin 213 and/or encryption key 211.

The cache files 225 can be generated or stored at a cache database 214. In embodiments, the client application 222 can store one of the cache files 225 in the cache database 214. The cache database 214 accessible to the device 220 when a server 202 is offline or inaccessible from the device 220. In some embodiments, the cache files 225 can include encrypted user data 215. The cache database 214 can couple with or be a component of a device 220. The cache database 214 can include a browser cache to store data or content accessed by or interacted with by the browser 221 and/or client application 222 executing on the device 220. The cache files 225 can correspond to at least one entry or memory location with the cache database 214. In some embodiments, each of the cache files 225 can be segregated in the cache database 214 based on the at least one user associated with the respective cache file 225. For example, at least one entry or memory location with the cache database 214 can be unique to a user of a device 220 such that user data 215 for the corresponding user is stored in the corresponding entry or memory location (e.g., cache file 225). The cache database 214 can include a plurality of entries or memory locations that are segregated based on a specific user such that the user data 215 for the respective user is segregated and separated from other entries or user data 215 for other users of the respective device 220.

Referring now to operation (304), and in some embodiments, a request to access resources 234 can be received. A client application 222 executing on a device 220 can transmit a request to the server 202 for a listing of resources 234 a user of the device 220 is permitted to access. For example, the server 202 can include or correspond to a resource delivery platform that provides access to a plurality of resources 234. The resources 234 can include but not limited to, desktops (e.g., virtual desktops), applications (e.g., virtual applications, SaaS applications, web applications, mobile applications) and other forms of content. Users (e.g., clients, customers) of the server 202 can be allowed or permitted to access some or all of the resources 234 based in part on access policies and credentials of the respective user. In some embodiments, the server 202 can make a determination on the resources 234, number of resources 234, and/or type of resources 234 a user is permitted to access responsive to an authentication of the user via an authentication module 206.

In embodiments, the client application 222 can be executing within a browser 221 of the device 220 (e.g., client device). The client application 222 can establish or broker a connection with the server 202 for the device 220. The client application 222 can generate the request responsive to an interaction from a user of the device 220. For example, a user of the device 220 can interact with a prompt generated by the client application 222 and provided to the user of the device 220 through the browser 221. The user interaction may include, but not limited to, a keyboard input, a mouse input, a camera input, a tactile input, an audio input, a visual input, and/or a gesture input. The client application 222 can transmit the request for one or more resources 234 to the server 202.

Referring now to operation (306), and in some embodiments, a server 202 can determine a user of the device 220 needs to authenticate. For example, the server 202 can determine that the request from the client application 222 corresponds to an initial request or first time request. A determination can be made that the user of the device 220 has not authenticated to the server 202 for a current session to the server 202 or previously with the server 202. The server 202 can identify the user of the device 220 based in part on the request and perform a look up to an authentication module 206 coupled with the server 202. The server 202 can use the lookup to determine that the user of the device 220 needs to authenticate so that the server 202 can determine the one or more resources 234 the corresponding user is permitted to access. The server 202, responsive to the determination, can transmit a response to the device 220 through the client application 222 indicating that the user needs to authenticate to the server 202. The response can include an address (e.g., IP address) for the authentication module 206 to authenticate the user.

Referring now to operation (308), and in some embodiments, a login request can be received by from a client application 222 executing on the device 220. The login request can be received by an authentication module 206 or the server 202. The client application 222 can generate a login request to authenticate the user of the device 220 to the server 202. In some embodiments, the login request can be transmitted to the server 202. The server 202 can contact or transmit the login request to the authentication module 206 to authenticate the user. In some embodiments, the client applications 222 can transmit the login request to the authentication module 206. In some embodiments, a determination can be made that the user of the device 220 needs to provide credentials. The authentication module 206 can receive the login request and determine that the user of the device 220 has not provided credentials (e.g., authentication credentials). The authentication module 206 can generate a response to the login request requesting credentials corresponding to the user of the device 220 and the device 220. The authentication module 206 can transmit the response for credentials to the device 220 through the client application 222.

In embodiments, the client application 222 executing on the device 220 can prompt the user of the device 220 for credentials. For example, responsive to receiving the request from the authentication module 206 for credentials, the client application 222 can generate a prompt for the user of the device 220. The client application 222 can provide an interface to a user of the device 220 through a browser 221 of the device 220 to provide credentials (e.g., authentication credentials) to authenticate the user. In some embodiments, the client application 222 can provide the credentials corresponding to a user of the device 220 to the authentication module 206. The credentials can include authentication credentials, a user identifier 224 corresponding to the user of the device 220, a device identifier, properties of the device 220, and/or user credentials.

Referring now to operation (310), and in some embodiments, the authentication module 206 can validate the credentials corresponding to the user of the device 220. The authentication module 206 can receive the credentials and compare the credentials to one or more access policies for a plurality of resources 234. The authentication module 206 can determine which resources 243 the corresponding user can access and a level of access to the respective resources 234. For example, the authentication module 206 can verify the authentication credentials provided within by the client application 222 and corresponding to the user of the device 220. The authentication module 206 can generate a list of resources 234 the user has permission to access. The list of resources 243 can include a single resource 234 or multiple resources 234. The authentication module 206 can generate a response and transmit the response to the device 220 through the client application 222. The response can include the list of resources 234 the user has permission to access.

Referring now to operation (312), and in some embodiments, a pin 213 can be generated. For example, a determination can be made that the user of the device 220 needs to generate a pin 213. In embodiments, responsive to validating the credentials or during the authentication, the authentication module 206 can determine that the user of the device 220 does not have a pin 213 or has not provided a pin 213. The authentication module 206 can perform a lookup to an entry generated for the user of the device 220 at the authentication module 206 to store credentials corresponding to the user of the device 220. The authentication module 206 can determine that the credentials provided by the client application 222 do not include a pin 213. The authentication module 206 can determine that the entry for the user of the device 220 does not include a pin 213. For example, the authentication module 206 can review the entry generated for the user of the device 220 at the authentication module 206 and determine that no pin 213 is stored in the entry or has been received at the authentication module 206. In embodiments, the authentication module 206 can review the credentials provided by the client application 222 and determine that the respective user of the device 220 has not established or provided a pin 213. The authentication module 206 can generate a request for the user of the device 220 to provide a pin 213. The authentication module 206 can transmit the request to the device 220 through the client application 222.

In embodiments, the client application 222 executing on the device 220 can prompt a user of the device 220 to provide a pin 213. The client application 222 can generate a prompt or an interface within the browser 221 of the device 220 for the user of the device 220 to enter or otherwise provide a pin 213. In some embodiments, the client application 222 can generate a temporary or initial pin 213 for a user of the device 220. The client application 222 can use the temporary pin 213 for the user until the user updates the pin 213 or otherwise provides a pin 213. The client application 222 executing on the device 220 can provide the pin 213 for the user of the device 220 to the authentication module 206. The client application 222 can transmit the pin 213 to the authentication module 206.

The authentication module 206 can store the pin 213. For example, the authentication module 206, responsive to receiving the pin 213 from the client application 222, can store the pin 213 in at least one entry of the authentication module 206 for storing credentials and data corresponding to the user of the device 220. In some embodiments, the authentication module 206 can store the pin 213 in a pin database 212. The pin database 212 can be a component of the server 202 and executing on the server 202 or a component of the authentication module 206 and executing on the authentication module 206. In some embodiments, the pin database 212 can be a remote database communicatively coupled with the authentication module 206. The authentication module 206 can generate an entry in the pin database 212 for the pin 213 corresponding to the user of the device 220. In some embodiments, the authentication module 206 can generate an entry in the pin database 212 for each user that interacts with the server 202 and/or authentication module 206.

Referring now to operation (314), and in some embodiments, the authentication module 206 can generate an authentication token 207. The authentication module 206 can generate an authentication token 207 (e.g., security token) responsive to authenticating the user of the device 220. The authentication token 207 can enable the server 202 to authorize a user of the device 220 to access one or more resources 23. For example, the authentication token 207 can correspond to a list of resources 234 the respective user is permitted to access and/or a level of access to the one or more resources 234. In embodiments, the authentication token 207 can be used by the device 220 and/or client application 222 to provide or establish access to one or more resources 243 included on the list of the resources 234. For example, the authentication module 206 can generate an authentication token 207 for each resource 234 the user is permitted to access. The authentication module 206 can generate an authentication token 207 that identifies all of the resources 234 the respective user is permitted to access. The authentication module 206 can transmit the authentication token 207 to the device 220 through the client applications 222.

Referring now to operation (316), and in some embodiments, the client application 222 executing on the device 220 can access resources 234 using the authentication token 207. The client application 222 can identify at least one resource 234 from the list of resources 234 and transmit the authentication token 207 to the respective resource 234 or server hosting the respective resource. In some embodiments, the server 202 can broker or establish the connection to the resource 234. For example, the client application 222 can transmit the authentication token 207 to the server 202. The authentication token 207 can identify the resource 234 the client applications 222 wants to establish a connection to or a type of resource 234 the client applications 222 wants to establish a connection to. In some embodiments, the client application 222 can transmit the authentication token 207 responsive to receiving a selection for at least one resource 234 included within the list of resources 234. For example, the client application 222 can provide the list of resources 234 to the user of the device 220 through the browser 221. The client application 222 can receive a selection through a user interaction with the list of resources 234. The client application 222 can identify the authentication token 207 corresponding to the selected resource 234 and transmit the authentication token 207 to the server 202 or the authentication module 206.

In embodiments, the server 202 can provide one or more resources 234 to the device 220 through the client application 222. The server 202 can identify the resource 234 or a server hosting the resource 234 requested by the client application 222 and identified in the authentication token 207. The server 202 can broker or establish a connection to the resource 234 and the client application 222 executing on the device 220. In some embodiments, the resource 234 or server hosting the resource 234 can provide access to the device 220 through the client application 222. The resource 234 can receive the authentication token 207 and establish a connection the device 220 through the client application 222. The client application 222 can maintain the connection and access to the resource 234 for the device 220 through the browser 221.

Referring now to operation (318), and in some embodiments, a client application 222 executing on a device 220 can request a user ID 224 and a pin 213. The client application 222 can transmit a request to the authentication module 206 for a user ID 224 and a pin 213 corresponding to the user of the device 220. The request can include credentials corresponding to the user of the device 220 to identify the respective user to the authentication module 206. The request can include an authentication token 207 corresponding to the user of the device 220 and generated by the authentication module 206. In embodiments, user IDs 224 and pins 213 for a plurality of users can be stored at the authentication module 206. For example, the authentication module 206 can include a database having at least one entry for each user of the plurality of users and can store the user ID 224 and pin 213 for a respective user in the corresponding entry. In embodiments, the pin 213 for the user of the application 222 can be stored at the authentication module 206 of the server 202. In some embodiments, the authentication module 206 can include or be coupled with a pin database 212 that stores pins 213 for the plurality of users.

In embodiments, an authentication module 206 can provide the user ID 224 and the pin 213 pin 213 corresponding to the user of the device 220. The authentication module 206 can identify the entry corresponding to the user of the device 220 and extract the corresponding user ID 224 and pin 213. In some embodiments, the authentication module 206 can retrieve or extract the user ID 224 and pin 213 from the pin database 212. The authentication module 206 can generate a response to the client application 222. The response can include the user ID 224 and pin 213 for the user of the device 220. The authentication module 206 can transmit the response with the user ID 224 and pin 213 to the client application 222.

Referring now to operation (320), and in some embodiments, the client application 222 executing on the device 220 can generate a hash ID 223 (e.g., cache lookup key) for the user of the device 220. The client application 222 can generate a hash ID 223 for the user. The client application 222 can generate a hash ID 223 based in part on attributes of the user and/or one or more identifiers generated or provided by the user. For example, in some embodiments, the client application 222 can generate a hash ID 223 for the user based in part on the user ID 224 of the user. In embodiments, the hash ID 223 can correspond to a hash of the user ID 224 and a tenant ID corresponding to the user. In some embodiments, the client application 222 can generate a unique hash ID 223 for each user of the plurality of users. The hash ID 223 can be used to index, segregate or otherwise separate user data corresponding to different users. For example, the hash ID 223 can be used to index, segregate or otherwise separate user data for a first user from user data from a second, different users. The client application 222 can associate or assign the hash ID 223 (e.g., cache lookup key) to at least one cache file 225 for a user of the device such that the respective cache file 225 can be identified using the hash ID 223. In some embodiments, the client application 222 can transmit the hash ID 223 with the cache file 225 to the cache database 214 to store the hash ID 223 and the cache file 225 at the cache database 214. The cache file 225 can be indexed and stored at the cache database 214 using the hash ID 223. For example, the cache database 214 can store a plurality of cache files 225 for a plurality of users and each of the cache files 225 can be indexed and segregated by the hash ID 223 of a user corresponding to the respective cache file 225.

Referring now to operation (322), and in some embodiments, an encryption key 211 can be generated for a user of the device 220. In embodiments, the client application 222 (or computing device 220) can generate an encryption key 211 for one of the cache files 225 or at least one cache file 225 of the plurality of cache files. The encryption key 211 can be associated with a user of the application 222. In embodiments, the encryption key 211 can be associated with a user identifier 224 so that the encryption key 211 is not accessible by other users of the computing device 220. For example, the encryption key 211 can be used to encrypt user data 215 generated by and/or corresponding to a particular user. The encryption key 211 can be generated by a trusted module of the device 220 and/or the edge server 228. For example, the encryption key 211 can be generated by a trusted module 226 or an edge server 228. The client application 222 can contact or determine whether the trusted module 226 or edge sever 228 is available or otherwise accessible from the device 220. For example, the client application 222 can transmit a status request to the trusted module 226 and/or the edge server 228 requesting a status (e.g., online, available) for the trusted module 226 and/or the edge server 228, respectively. The trusted module 226 can transmit a status response indicating the trusted module 226 is available. The edge server 228 can also transmit a status response indicating the trusted module 226 is available. In some embodiments, the client application 222 can request a status from the server 202 for the trusted module 226 or edge sever 228 to determine if the trusted module 226 or edge sever 228 is available or otherwise accessible from the device 220.

In embodiments, if the trusted module 226 is available and accessible from the device 220, the client application 222 can transmit a request to the trusted module 226 to generate an encryption key 211. The encryption key 211 can be generated for a user responsive to the user accessing the device 220 for a first time or initial time. For example, the user can login to the device 220 through the client application 222. The device 220 can correspond to a shared client device accessed or used by a plurality of clients. The client application 222 can receive the login request and transmit a request to the trusted module 226 to generate an encryption key 211 for the user. In some embodiments, the trusted module 226 can detect that the user has accessed the device 220 through the client application 222 and generate an encryption key 211 for the user.

In some embodiments, the client application 222 can determine the trusted module 226 is not accessible from the device 220. The client application 222 can transmit a request to the authentication module 206 of the server for address data corresponding to the edge server 228. The authentication module 206 can provide the address data for the edge server 228 to the client application 222. The client application 222 can transmit a request to the edge server 228 to generate an encryption key 211. The edge server 228 can generate the encryption key 211 for the user of the device 220. In embodiments, a unique encryption key 211 can be generated for each user of a device 220 (e.g., shared device). Responsive to generating the encryption key 211, the trusted module 226 or the edge server 228 can transmit a key ID to the client application 222 indicating the encryption key 211 has been generated for the user of the device 220. The key ID can include an identifier corresponding to the respective encryption key 211. For example, the client application 222 can use the key ID to retrieve, at a subsequent time, the corresponding encryption key 211 from the trusted module 226 or the edge server 228.

The encryption key 211 can be protected and secured using the pin 213 provided by the user of the device 220. For example, in some embodiments, the trusted module 226 or the edge server 228 can store a pin 213 or a portion of the pin 213 with the corresponding encryption key 211 for a user of the device 220. Thus, to retrieve the encryption key 211, the client application can provide the key ID corresponding to the encryption key 211 and the pin 213 corresponding to the user of the device 220. The trusted module 226 or the edge server 228 can use the key ID to identify the correct encryption key 211 for a request. The trusted module 226 or the edge server 228 can compare the pin 213 received in the request to retrieve the encryption key 211 to the pin 213 stored with the encryption key 211. If the pins 213 match, the trusted module 226 or the edge server 228 can provide the encryption key 211 to the client application 222 responsive to the retrieval request. If the pins 213 do not match, the trusted module 226 or the edge server 228 can deny or reject the retrieval request.

In some embodiments, an edge server 228 can generate the encryption key 211. For example, the client application 222 executing on the device 220 can request an address for an edge server 228 from the authentication module 206. The client application 222 can transmit a request to the edge server 228 to generate an encryption key 211 for a user of the device 220. The edge server 228 can generate the encryption key 211 for the user of the device 220. For example, the edge server 228 can generate the encryption key 211 responsive to the user accessing the device 220 for a first time or initial time. For example, the user can login to the device 220 through the client application 222. The client application 222 can receive the login request and transmit the login request to the edge server 228 to generate an encryption key 211 for the user. In some embodiments, the edge server 228 can detect that the user has accessed the device 220 through the client application 222 and generate an encryption key 211 for the user. In some embodiments, the trusted module 226 can provide the encryption key 211 to a client application 222 executing on the device 220. The trusted module 226 can provide the encryption key 211 for the user to the client application 222. In embodiments, the edge server 228 can provide the encryption key 211 to a client application 222 executing on the device 220.

Referring now to operation (324), and in some embodiments, data can be stored at a cache database 214. For example, address information for the trusted module 226, address information for the edge server 228, and cache file 225 (e.g., cache index) can be stored at a cache database 214. In embodiments, the client application 222 can transmit a request to the cache database 214 to store user data 215 corresponding to the user of the device 220. The user data 215 can include, but not limited to, the key ID corresponding to the encryption key 211 generated for the user of the device 220, address information for the trusted module 226, address information for the edge server 228, a hash ID 223, and/or a cache file 225. The cache database 214 can store the user data in an entry generated for the corresponding user of the device 220 such that the user data for the respective user is segregated and separated from other entries or user data for other users of the respective device 220. In some embodiments, the encryption key 211 can be stored using a pin 213 in a trusted module 226 of the edge server 228 or the device 220. For example, the pin 213 can be used to retrieve the encryption key 211 from the trusted module 226. The pin 213 and the encryption key 211 can be used to access the encrypted user data 215 in the one of the cache files 225. In embodiments, the cache database 214 can transmit an indication to the client application 222 that the encryption key 211, address information for the trusted module 226, address information for the edge server 228, and cache file 225 (e.g., cache index) is stored at a cache database 214. For example, the indication can include address information for the cache database 214. The indication can include an entry location with the cache database 214 where the data is stored.

Referring now to operation (326), and in some embodiments, a client application 222 executing on a device 220 can request the encryption key 211 corresponding to a user of the device 220. For example, the client application 222 can request the encryption key 211 corresponding to or generated for the user of the device 220. The request can include a key ID corresponding to the encryption key 211, a user ID 224 corresponding to the user of the device 220 and a pin 213 corresponding to the user of the device 220.

The client application 222 can transmit the request for the encryption key 211 to the trusted module 226, the edge server 228 or both the trusted module 226 or the edge server 228. In some embodiments, the client application 222 can determine that the trusted module 226 is available and transmit the request to the trusted module 226 for the encryption key 211 corresponding to the user of the device 220. In some embodiments, the client application 222 can determine that the trusted module 226 is not available or inaccessible from the device 220 and transmit the request to the edge server 228 for the encryption key 211 corresponding to the user of the device 220. For example, the client application 222 can transmit a request to the trusted module 226 for the encryption key 211 and not receive a response. In embodiments, the client application 222 can transmit a request to the trusted module 226 for the encryption key 211 and receive a response that the request is denied. The client application 222 can determine that a connection 260 to the trusted module 226 unavailable. In some embodiments, the client application 22 can transmit the request for an encryption key 211 to the edge server 228. For example, the client application 22 can transmit the request to the edge server 228 responsive to determining the trusted module 226 is not available or inaccessible from the device 220. The request can include a user ID 224 corresponding to the user of the device 220 and a pin 213 corresponding to the user of the device 220.

The trusted module 226 or the edge server 228 can use the key ID to identify the correct encryption key 211 for the request. For example, the trusted module 226 or the edge server 228 can compare the pin 213 received in the request to retrieve the encryption key 211 to the pin 213 stored with the encryption key 211. If the pins 213 match, the trusted module 226 or the edge server 228 can provide the encryption key 211 to the client application 222 responsive to the retrieval request. If the pins 213 do not match, the trusted module 226 or the edge server 228 can deny or reject the retrieval request. For example, the edge server 228 can generate and provide a response for client application 222 indicating the pins 213 do not match. In embodiments, the trusted module 226 can provide the encryption key 211 to the client application 222. In some embodiments, the edge server 228 can provide the encryption key 211 to the client application 222.

Referring now to operation (328), and in some embodiments, user data 215 corresponding to a user of the device 220 can be encrypted using the encryption key 211. In embodiments, the client application 222 can encrypt the user data 215 in one of the cache files 225 with the encryption key 211. The user data 215 can be encrypted using the encryption key 211 that was uniquely generated for the user of the device 220. In some embodiments, the user data 215 can be encrypted with a unique key, the encryption key 211, and prior to being stored at the cache database 214. Responsive to encrypting the user data 215, the client application 222 can transmit the encrypted user data to the cache database 214 to store the encrypted user data. In some embodiments, the client application 222 can transmit a request to the cache database 214 to store the encrypted user data in at least one segregated entry generated for data corresponding to the user of the device 220. For example, the cache database 214 can store user data for each user at different entries or locations within a database or within the cache database 214 such that the data for each user is segregated from data from other users within the respective database or cache database 214.

Referring now to operation (330), and in some embodiments, the client application 222 can store the encrypted user data 215 at the cache database 214. The cache database 214 can identify an entry or location corresponding to the user of the device 220 and store the received encrypted user data in the identified entry or location corresponding to the user of the device 220. In some embodiments, the cache database 214 store the received encrypted user data in an entry or location included within the request to store the user data from the client application 222. The cache database 214 can transmit an indication that the encrypted user data 215 has been stored at the cache database 214. The cache database 214 can generate a response to the client application 222 to indicate that the encrypted user data for the user of the device 220 has been stored at the cache database 214 or a database coupled with the cache database 214.

Referring now to operation (332), and in some embodiments, a client application 222 executing on the device 220 can request a connection lease 209 for a resource 234. In embodiments, the client application 222 can transmit the request for the connection lease 209 to the server 202. The connection leases 209 can be used to establish a connection 260 to one or more resources 234 from a device 220. For example, the client application 222 can transmit a request to the server 202 for one or more connection leases 209. The request can include an identifier for the respective one or more connection leases 209. In some embodiments, the request can include an identifier for a resource 234. The server 202 can generate or identify a connection lease 209 corresponding to the requested resource 234 or a server hosting the requested resource 234. In some embodiments, the server 202 can transmit the connection lease 209 for the requested resource 234 to the client application 222. For example, the server 202 can transmit at least one connection lease 209 to the client application 222 responsive to receiving a request for a connection lease 209. The client application 222 can encrypt the connection lease 209 using the encryption key 211. In some embodiments, the client application 222 can encrypt the connection lease 209 using the encryption key 211 uniquely generated for the user of the device 220.

Referring now to operation (334), and in some embodiments, the client application 222 can store the encrypted connection lease 209 at the cache database 214. In embodiments, the client application 222 can transmit the encrypted connection lease 209 to the cache database 214 to store the encrypted connection lease 209. The encrypted connection lease 209 can be stored in the same segregated entry or location that the encrypted user data is stored at on the cache database 214 or database coupled with the cache database 214.

Referring now to operation (336), and in some embodiments, a client application 222 executing on a device 220 can request access to one or more resources 234. The client application 222 can transmit a request to the server 202 for access to a resource 234. For example, the server 202 can establish or broker connections to a plurality of resources 234 for one or more users of a device 220. In some embodiments, the server 202 may be offline or inaccessible from the device 220. The client application 222 can provide offline access to the plurality of resources 234 based in part on the encrypted user data for the user of the device and stored at the cache database 214. Thus, the client application 222 can provide access to the resources 234 when the server 202 is offline or inaccessible from the device 220.

In some embodiments, the client application 222 can determine that the server 202 is offline or inaccessible from the device 220 responsive to transmitting the request. For example, the client application 222 can detect a status of the server 202 or a status of a connection to the server 202 to determine that the server 202 is offline or inaccessible from the device 220. In some embodiments, the client application 222 can wait a period of time for a response. If the server 202 does not transmit a response within the period of time, the client application 222 can determine that the server 202 is offline or inaccessible from the device 220.

Referring now to operation (338), and in some embodiments, a client application 222 executing on a device 220 can prompt the user of the device 220 for a pin 213 and a user ID 224. In embodiments, response to determining that the server 202 is offline or inaccessible, the client application 222 can generate a prompt for the user of the device 220 through a browser 221 of the device 220. The prompt can include, but not limited to, an interface, text-based or command line interface, for the user of the device 220 to enter a pin 213 and a user ID 224. The pin 213 can include a numerical pin, alphabetic pin, alphanumeric pin, symbols, or characters or any combination of them. The user ID 224 can include a numerical pin, alphabetic pin, alphanumeric pin, symbols, or characters or any combination of them.

Referring now to operation (340), and in some embodiments, the client application 222 can request for a key ID of an encryption key 211 corresponding to the user of the device 220. The client application 222 can request the encryption key 211 from a trusted module 226 or an edge server 228. For example, the client application 222 can transmit a request including the pin 213 provided by the user of the device 220 and the user ID 224 corresponding to the user of the device 220. In some embodiments, the client application 222 can transmit a request for the encryption key 211 to the trusted module 226. The request can include the key ID retrieved from the cache database 214 and the pin 213 provided by the user of the device. The client application 222 can transmit the request for the encryption key 211 to the trusted module 226 on the edge server 228. In some embodiments, the client application 222 can contact or determine the trusted module 226 or edge sever 228 to determine if the trusted module 226 or edge sever 228 is available or otherwise accessible from the device 220. For example, the client application 222 can transmit a status request to the trusted module 226 and/or the edge server 228 requesting a status (e.g., online, available) for the trusted module 226 and/or the edge server 228, respectively. The trusted module 226 can transmit a status response indicating the trusted module 226 is available. The edge server 228 can transmit a status response indicating the trusted module 226 is available. In some embodiments, the client application 222 can request a status from the server 202 for the trusted module 226 or edge sever 228 to determine if the trusted module 226 or edge sever 228 is available or otherwise accessible from the device 220.

In some embodiments, the client application 222 can transmit a request for the encryption key 211 to the trusted module 226. The request can include the key ID retrieved from the cache database 214 and the pin 213 provided by the user of the device. The client application 222 can transmit the request for the encryption key 211 to the trusted module 226 or the edge server 228. In some embodiments, the client application 222 can contact or determine the trusted module 226 or edge sever 228 to determine if the trusted module 226 or edge sever 228 is available or otherwise accessible from the device 220. For example, the client application 222 can transmit a status request to the trusted module 226 and/or the edge server 228 requesting a status (e.g., online, available) for the trusted module 226 and/or the edge server 228, respectively. The trusted module 226 can transmit a status response indicating the trusted module 226 is available. The edge server 228 can transmit a status response indicating the trusted module 226 is available. In some embodiments, the client application 222 can request a status from the server 202 for the trusted module 226 or edge sever 228 to determine if the trusted module 226 or edge sever 228 is available or otherwise accessible from the device 220.

If the trusted module 226 is available and accessible from the device 220, the client application 222 can transmit the request to the trusted module 226 to generate an encryption key 211 or retrieve an existing encryption key 211 for the user of the device 220. The trusted module 226 can retrieve the encryption key 211 using the key ID and the pin 213. For example, the trusted module 226 can use the key ID to identify the appropriate encryption key 211 corresponding to the user of the device 220. The encryption key 211 can be stored at the trusted module 226. The trusted module 226 can retrieve the encryption key 211 from the trusted module 226. The encryption key 211 can be stored with or linked with a pin 213 previously provided by the user of the device 220. The trusted module 226 can compare the pin 213 provided in the request with the pin 213 previously stored with the encryption key 211. If the pins 213, the trusted module 226 can provide the corresponding encryption key 211 to the client application 222. If the pins 213 do not match, the trusted module 226 can reject or deny the request for the encryption key 211. Thus, the encryption key 211 can be protected by the pin 213. For example, in embodiments, without the correct pin 213, the client application 222 cannot retrieve an encryption key 211 for a user of the device.

In some embodiments, the client application 222 can determine the trusted module 226 is not accessible from the device 220. The client application 222 can transmit a request to the authentication module 206 of the server 202 or the cache database 214 for address data corresponding to the edge server 228. The authentication module 206 can provide the address data for the edge server 228 to the client application 222. In some embodiments, the cache database 214 can provide the address data corresponding to the edge server 228 and previously stored at the cache database 214 to the client application 222.

The client application 222 can transmit the request to the edge server 228 to generate an encryption key 211 or retrieve an existing encryption key 211 for the user of the device 220. The edge server 228 can access the encryption key 211 stored at the edge server 228 using the key ID and the pin 213. For example, the edge server 228 can use the key ID to identify the appropriate encryption key 211 corresponding to the user of the device 220. The encryption key 211 can be stored with or linked with a pin 213 previously provided by the user of the device 220. The edge server 228 can compare the pin 213 provided in the request with the pin 213 previously stored with the encryption key 211. If the pins 213, the edge server 228 can provide the corresponding encryption key 211 to the client application 222. If the pins 213 do not match, the edge server 228 can reject or deny the request for the encryption key 211. Thus, the encryption key 211 can be protected by the pin 213. For example, in embodiments, without the correct pin 213, the client application 222 cannot retrieve an encryption key 211 for a user of the device.

Referring now to operation (342), and in some embodiments, the client application 222 can transmit a request for the encrypted user data 215 to the cache database 214. The request can include a hash ID 223 corresponding to the user of the device 220, the user ID 224 corresponding to the user of the device and/or an entry and/or location of the cache database 214 storing the encrypted user data corresponding to the user of the device 220. In some embodiments, the client application 222 can retrieve the encrypted user data 215 from the cache database 214. The cache database 214 can retrieve the encrypted user data corresponding to the user of the device 220. The cache database 214 can use one or more of the hash ID 223 corresponding to the user of the device 220, the user ID 224 corresponding to the user of the device and/or an entry and/or location of the cache database 214 storing the encrypted user data to identify the correct encrypted user data. The cache database 214 can provide the encrypted user data 215 to the client application 222 executing on the device 220.

Referring now to operation (344), and in some embodiments, the client application 222 can decrypt the encrypted user data using the encryption key 211. In some embodiments, the user data can include a list of resources 234 the user of the device 220 is permitted to access. The client application, responsive to the decryption, can provide or display to the user of the device 220 through the browser 221, a list of resources 234. For example, the client application 222 can provide the user of the device 220 a menu or listing of resources 234 in the form of an interface. Each of the resources 234 can be represented by a symbol, text box, selection box, or other form of interface to provide the user of the device 220 an ability to interact with and/or select at least one resource 234 provided within the list of resources 234.

Referring now to operation (346), and in some embodiments, the client application 222 can receive a selection of at least one resource 234 included within the list of resources 234. The client application can receive at least one interaction from the user of the device 220 corresponding to a selection of at least one resource 234 from the list of resources 234. For example, a user of the device 220 can select a link, an icon, or symbol corresponding to a resource 234 and provided within the list of resources 234. In some embodiments, the user of the device 220 can enter a text phrase indicating a resource 234. For example, the text phrase can include a title of the resource 234 or an identifier (e.g., alphanumerical identifier) corresponding to the resource 234. The client application 222 can transmit a request for an encrypted connection lease 209 corresponding to the selected resource 234. The client application 222, responsive to the interaction with the list of resources 234, can identify the selected resource 234. The client application 222 can transmit a request to the cache database 214 for an encrypted connection lease 209 corresponding to the selected resource 234. In some embodiments, the request can include a lease identifier provided to the cache database 214 such that the cache database 214 can identify and retrieve the correct connection lease 209 corresponding to the selected resource 234. In some embodiments, the cache database 214 can transmit the encrypted connection lease 209 corresponding to the selected resource 234 to the client application 222. The client application 222 can decrypt the connection lease 209 using the encryption key 211 corresponding to the user of the device 220.

Referring now to operation (348), and in some embodiments, the client application 222 can identify the resource provider 230 (e.g., server) hosting or providing the requested resource 234. The client application can transmit a request to the resource provider 230 to establish a connection between the device 220 and the resource provider 230. The request can include the connection lease 209. The resource provider 230 can receive the request including the connection lease 209 and establish or allow a connection between the device 220 and the resource 234 via the client application 222. For example, the resource provider 230 can establish a connection to the client application 222 to provide the selected resource 234. The client application 222 can broker the connection between the device 220 and the resource provider 230.

Referring now to operation (350), and in some embodiments, the client application 222 can present the user data 215 to the user of the device 220. In embodiments, the client application 222 can present the encrypted user data to 215 a user via the shared computing device 220 based on receipt of the user identifier 224 that enables access to the encryption key 211 by the user. The encrypted user data 215 can be presented without the encrypted user data or the encryption key of the user being accessible to other users of the shared computing device 220. For example, the client application 222 can present the decrypted user data 215 that has been decrypted using the encryption key 211 associated with the user of the device 220 and the encryption key 211 retrieved with the user ID 224 associated with the user of the device 220.

The client application 222 can present the user data 215 corresponding to the resource 234 selected by the user of the device 220. For example, the client application 222 can present the user data 215 through a browser 221 of the device 220. In some embodiments, the user data 215 can include or correspond to cache data from a previous session to the selected resource 234. For example, in embodiments in which the server 202 is offline or inaccessible from the device 220, the client application 222 can present or provide user data 215 from or corresponding to session data from at least one session or previous session with selected resource 234. The user data 215 can include cache data or browser cache data generated during one or more previous sessions with the selected resource 234 by the user of the device 220. In some embodiments, the user data 215 can include browser cache data stored, accessed by or interacted with by the browser 221 and/or client application 222 executing on the device 220 during one or more previous sessions with the selected resource 234 by the user of the device 220. Thus, the client application 222 can establish a session to the selected resource 234 when the server 202 is offline or inaccessible from the device 220 using the user data 215 (e.g., cache data).

In some embodiments, the client application 222 can receive an indication of a session time out. For example, the client application 222 can monitor the connection between the device 220 and the resource 234. If no activity occurs for a predetermined time period, the client application 222 can determine the session is over or receive an indication of a time out event. In some embodiments, the client application 222 can receive a logout event from a user of the device 220. The client application 222 can end or disconnect the device 220 from the resource 234 or resource provider 230 responsive to a session time out event or logout event.

Referring now to operation (352), and in some embodiments, the client application 222 can discard or remove the pin 213 corresponding to the user of the device responsive to the session time out event or logout event. For example, the client application 222 can discard the pin 213 previously provided by the user of the device 220 such that if the same user attempts to login or access the device 220 after the session time out event or logout event, the same user can be prompted to re-enter the pin 213. In some embodiments, for each session, a user of the device 220 can be prompted to provide a pin 213 to maintain a security level of the pin 213. The client application 222 can discard or remove the pin from the browser 221 of the device 220 or a cache file of the device 220. The client application 222 can discard the decrypted user data 215 corresponding to the user of the device responsive to the session time out or logout event. For example, the client application 222 can discard the decrypted user data 215 such that if the same user attempts to login or access the device 220 after the session time out event or logout event, the corresponding user data can be retrieved from the cache database 214 and decrypted for each session of the user of the device 220. The client application 222 can discard or remove the decrypted user data from the browser 221 of the device 220 or a cache file of the device 220.

Figure 4A:
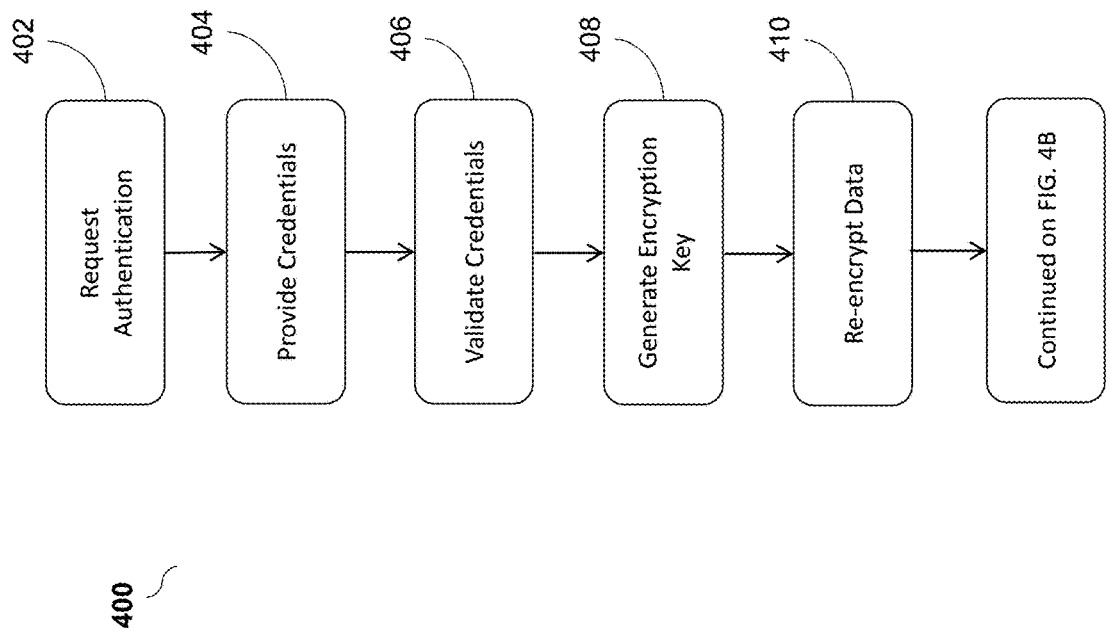
FIGS. 4A-4B are a flow diagram of a method for modifying a pin.
Figure 4B:
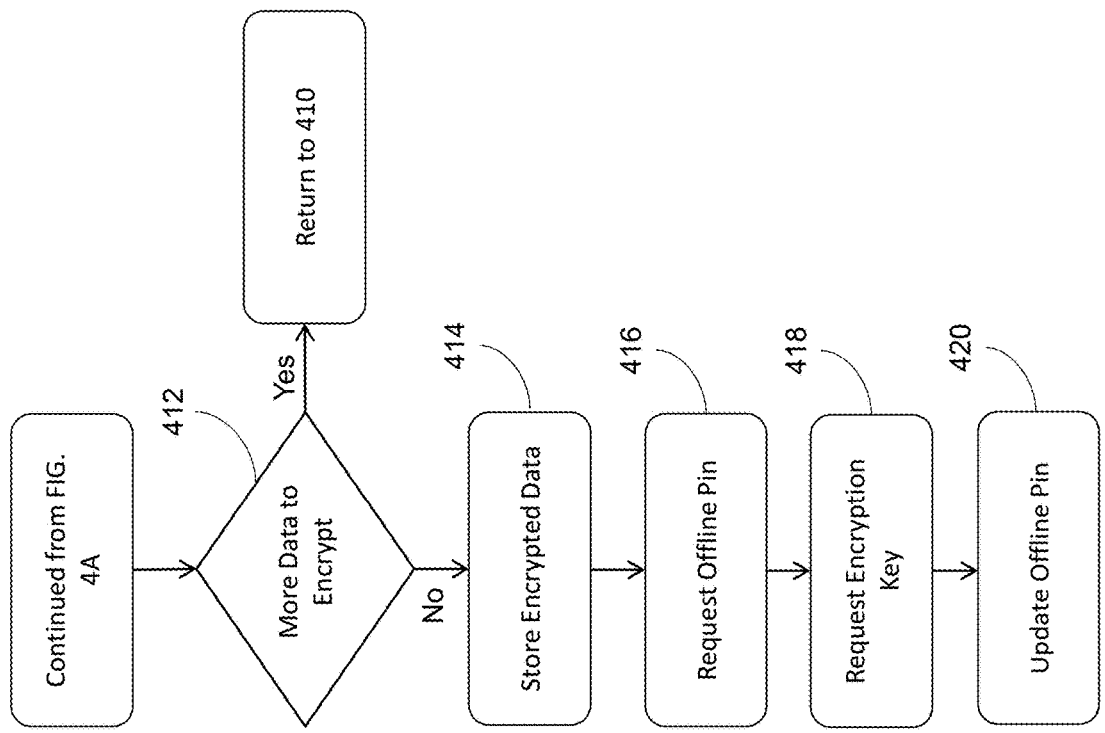

Referring now to FIGS. 4A-4B, depicted is a flow diagram of one embodiment of a method 400 for modifying a pin 213. The functionalities of the method 400 may be implemented using, or performed by, the components detailed herein in connection with FIGS. 1-2. In some embodiments, the pin 213 can be changed or modified. For example, a customer, organization, or network can set policies for a login threshold or time period threshold such that when a user of the device exceeds the threshold (e.g., 100 login events, every 6 months), the client application 222 can prompt the user to change their pin 213 or the server 202 can modify the pin 213 for the user. The policy or threshold can be configurable by each customer, organization or network.

Referring now to operation (402), and in some embodiments, a server 202 can determine that the user of a device 220 needs to authenticate. For example, the server 202 can determine that the user of the device 220 has not authenticated to the server 202. The server 202 can generate an instruction to the client application 222 to login through the authentication module 206. The client application 222 can execute a login event or login request to the authentication module 206. Responsive to the login request, the authentication module 206 can transmit a request to the client application 222 for credentials corresponding to the user of the device 220.

Referring now to operation (404), and in some embodiments, the client application 222 can prompt the user of the device 220 for credentials. For example, the client application 222 can generate a prompt in a browser 221 of the device 220. The client application 222 can receive credentials from the user of the device 220. The credentials can include, but not limited to, authentication credentials, a user identifier 224 corresponding to the user of the device 220, a device identifier, properties of the device 220, and/or user credentials. The client application 222 can transmit the credentials for the user of the device to the authentication module 206.

Referring now to operation (406), and in some embodiments, the authentication module 206 can validate the credentials corresponding to the user of the device 220. The authentication module 206 can receive the credentials and compare the credentials to one or more access policies for a plurality of resources 234. The authentication module 206 can determine which resources 243 the corresponding user can access and a level of access to the respective resources 234. For example, the authentication module 206 can verify the authentication credentials provided within by the client application 222 and corresponding to the user of the device 220. In some embodiments, the server 202 or the authentication module 206 can determine that the user of the device 220 needs to update their respective pin 213. The authentication module 206 can generate a temporary pin 213, new pin 213 or second pin 213 for the user of the device 220. The authentication module 206 can generate a response to the login request for the client application 222 and include an authentication token 207 indicating the user credentials have been validated, the previous pin 213 (e.g., first pin 213) and the new pin 213 (e.g., second pin 213) to the client application 222.

Referring now to operation (408), and in some embodiments, the client application 222 can use both the previous pin 213 (e.g., first pin 213) and the new pin 213 (e.g., second pin 213) to generate a new encryption key 211 corresponding to the new pin 213. For example, the client application 222 can transmit a request to the trusted module 226 for an encryption key 211 corresponding to the user of the device 220. The request can include the key ID corresponding to the existing encryption key 211, the previous pin 213, and the new pin 213. The trusted module can identify the correct or existing encryption key 211 for the user of the device 220 using the previous pin 213 and provide the existing encryption key 211 to the client application 222.

Responsive to receiving the existing encryption key 211, the client application 222 can transmit a request to the trusted module 226 to generate a new encryption key 211 for the user of the device 220 to be protected and secured using the new pin 213 (e.g., second pin 213). The trusted module 226 can, responsive to the request, generate a new encryption key 211 for the user of the device 220. In some embodiments, the trusted module 226 can, responsive to the request, generate a new encryption key 211 for the user of the device 220 using the new pin 213 (e.g., second pin 213) and associated with the user of the device 220. The trusted module 226 can generate a new key ID corresponding to the new encryption key 211 to be used by the client application 222 to retrieve the new encryption key 211. In embodiments, the trusted module 226 can provide the new key ID corresponding to the new encryption key 211 to the client application 222. The trusted module 226 can transmit a response indicating that the new encryption key 211 has been generated for the user of the device 220 and/or that the new encryption key 211 has been stored at the trusted module 226.

Referring now to operation (410), and in some embodiments, the client application 222 can re-encrypt the user data 215. For example, the client application 222 can generate a request to the cache database 214 for the encrypted user data 215 corresponding to the user of the device 220. The cache database 214 can transmit a response to the client application 222. The response can include the encrypted user data 215 corresponding to the user of the device 220. The encrypted user data 215 was previously encrypted using the existing or previous encryption key 211. Thus, the client application 222 can retrieve the user data 215 corresponding to the user of the device to re-encrypt the user data 215 with the new encryption key 211. For example, the client application 222 can decrypt the user data 215 using the previous encryption key 211 or first encryption key 211. The client application 222 can re-encrypt the user data 215 using the new encryption key 211 or second encryption key 211. Thus, the user data 215 can be re-encrypted with the new encryption key 211 generated responsive to the update the pin 213 for the user of the device 220.

Referring now to operation (412), and in some embodiments, the client application 222 can determine if more user data 215 needs to be re-encrypted. The client application can re-encrypt all of the user data 215 corresponding to the user of the device 220 at the same time. In some embodiments, the client application can re-encrypt user data items individually or in portions until all of the user data 215 corresponding to the user of the device 220 has been re-encrypted with the new encryption key 211. For example, the client application 222 can retrieve encrypted user data items 215 for the user of the device 220 individually or in groups until each user data item (e.g., encrypted connection leases 209, encrypted resource data, encrypted server address info) has been re-encrypted with the new encryption key 211. After each user data item 215 is re-encrypted the client application 222 can transmit a request to the cache database 214 to determine if more user data 215 associated with the user of the device 220 is stored at the cache database 214 and needs to be re-encrypted. In some embodiments, the cache database 214 can determine that not all of the user data 215 corresponding to the user of the device 220 has been re-encrypted with the new encryption key 211 or determine that more user data 215 corresponding to the user of the device 220 needs to be re-encrypted with the new encryption key 211. The cache database 214 can transmit a response indicating that more of the user data 215 corresponding to the user of the device 220 needs to be re-encrypted with the new encryption key 211 and can include at least one new user data item 215 for re-encryption or at least one new group of user data 215 for re-encryption. The method 500 can return to operation 510 to re-encrypt the user data 215. The client application 222 and cache database 214 can continually until each of the user data items 215 associated with the user of the device 220 have been re-encrypted with the new encryption key 211.

In some embodiments, the cache database 214 can determine that all of the user data 215 corresponding to the user of the device 220 has been re-encrypted with the new encryption key 211. The cache database 214 can transmit a response to the client application 222 indicating that all of the user data 215 corresponding to the user of the device 220 has been re-encrypted with the new encryption key 211.

Referring now to operation (414), and in some embodiments, client application 222 can store the encrypted user data 215. For example, the client application 222 can transmit the encrypted user data 215 to the cache database 214. The client application 222 can transmit a request to replace the old encrypted user data 215 corresponding to the user of the device 220 with the new encrypted user data 215 corresponding to the user of the device 220. For example, the client application 222 can transmit a request to remove or discard the previous or old encrypted user data 215 that was previously encrypted using the old encryption key 211. The client application 222 can update at least one cache file 225 at the cache database 214 (e.g., offline cache database) with the user data 215 encrypted using the new encryption key 211 or second encryption key 211. In some embodiments, the cache database 214 can transmit a response to the client application 222 indicating that the old encrypted user data 215 corresponding to the user of the device 220 has been replaced with the new encrypted user data 215 corresponding to the user of the device 220. For example, the cache database 214 can transmit a response indicating the old encrypted user data 215 that was previously encrypted using the old encryption key 211 has been removed from the entry in the cache database 214 corresponding to the user of the device 220. The response can indicate that the new encrypted user data 215 encrypted with the new encryption key 211 has been stored in the entry in the cache database 214 corresponding to the user of the device 220.

In some embodiments, the cache database 214 can transmit a response to the client application 222 indicating that the old encrypted user data 215 corresponding to the user of the device 220 has been replaced with the new encrypted user data 215 corresponding to the user of the device 220. For example, the cache database 214 can transmit a response indicating the old encrypted user data 215 that was previously encrypted using the old encryption key 211 has been removed from the entry in the cache database 214 corresponding to the user of the device 220. The response can indicate that the new encrypted user data 215 encrypted with the new encryption key 211 has been stored in the entry in the cache database 214 corresponding to the user of the device 220.

Referring now to operation (416), and in some embodiments, the client application 222 can request a pin 213. For example, the client application 222 can generate a prompt for a user of the device 220 to provide a pin 213. The client application 222 can receive the pin 213 from a user of the device 220, for example, through a browser 221 of the device 220. In some embodiments, the client application 222 can generate a temporary or initial pin 213 for a user of the device 220. The client application 222 can use the temporary pin 213 for the user until the user updates the pin 213 or otherwise provides a pin 213.

Referring now to operation (418), and in some embodiments, the client application 222 can request an encryption key 211 or a key ID of an encryption key 211 corresponding to the user of the device 220. The client application 222 can request the encryption key 211 from a trusted module 226 or an edge server 228. In some embodiments, the client application 222 can transmit a request for the encryption key 211 to the trusted module 226. The request can include the key ID retrieved from the cache database 214 and the pin 213 provided by the user of the device. The client application 222 can transmit the request for the encryption key 211 to the trusted module 226 or the edge server 228. For example, the client application 222 can transmit the request to the trusted module 226 to generate an encryption key 211 or retrieve an existing encryption key 211 for the user of the device 220. The trusted module 226 can retrieve the encryption key 211 using the key ID and the pin 213. In embodiments, the trusted module 226 can use the key ID to identify the appropriate encryption key 211 corresponding to the user of the device 220. The encryption key 211 can be stored at the trusted module 226 coupled with the trusted module 226. In some embodiments, the trusted module 226 can determine that the client application 222 provided an incorrect pin 213. For example, the encryption key 211 can be stored with or linked with a pin 213 previously provided by the user of the device 220. The trusted module 226 can compare the pin 213 provided in the request with the pin 213 previously stored with the encryption key 211. If the pins 213 do not match, the trusted module 226 can reject or deny the request for the encryption key 211. Thus, the encryption key 211 can be protected by the pin 213. For example, in embodiments, without the correct pin 213, the client application 222 cannot retrieve an encryption key 211 for a user of the device. The trusted module 226 can generate and transmit a response to the client application 222 indicating that an incorrect pin 213 was used or provided.

In some embodiment, the client application 222 can transmit the request to the edge server 228 to generate an encryption key 211 or retrieve an existing encryption key 211 for the user of the device 220. The edge server 228 can retrieve the encryption key 211 using the key ID and the pin 213. For example, the edge server 228 can use the key ID to identify the appropriate encryption key 211 corresponding to the user of the device 220. The encryption key 211 can be stored with or linked with a pin 213 previously provided by the user of the device 220. If the pins 213 do not match, the edge server 228 can reject or deny the request for the encryption key 211. The edge server 228 can generate and transmit a response to the client application 222 indicating that an incorrect pin 213 was used or provided.

Referring now to operation (420), and in some embodiments, the client application 222 can generate a prompt for a user of the device 220 to provide a pin 213. For example, the client application 222 can indicate to the user of the device 220 that the pin 213 for the user needs to be updated or modified. The client application 222 can indicate to the user that the existing pin 213 provided is no longer valid or has expired. In some embodiments, the client application 222 can apply one or more password policies 216 to the existing pin 213. The policies 216 can include a login threshold or time period threshold. For example, the login threshold can include a predetermined number of login events that a particular pin 213 can be used to login. When a pin 213 has been provided an amount of times exceeding or greater than the login threshold, the pin 213 is no longer valid and needs to be replaced or updated. The time period threshold can include a predetermined time period (e.g., two months, one year) during which a particular pin 213 can be used to login. When the time period is over, the pin 213 is no longer valid and needs to be replaced or updated and a new time period begins for the new updated pin 213.

In some embodiments, the client application 222 can receive an indication from an authentication module 206 of a server 202 that the user of the application 222 needs to change a pin 213 associated with the user of the application 222. For example, the authentication module 206 can apply one or more password policies 216 to the existing pin 213. The policies 216 can include a login threshold or time period threshold. For example, the login threshold can include a number of login events that a particular pin 213 can be used to login. The authentication module 206 can transmit an indication to the client application 222 to update the respective pin 213.

The client application 222 can determine or receive an indication that the existing pin 213 needs to be updated and can generate a prompt requesting the existing or previous pin 213 for the user of the device 220. The client application 222 can receive the pin 213 from a user of the device 220, for example, through a browser 221 of the device 220. The client application 222 can generate a prompt requesting a new pin 213 (e.g., second pin 213). The client application 222 can receive the new pin 213 from the user of the device 220 and remove or discard the previous pin 213. In embodiments, the client application 222 can generate a prompt for the user of the device 220 indicating that the pin 213 has been updated and provide the second pin 213 or new pin 213 to the user of the device 220. The user of the device 220 can use the new pin 213 or second pin 213 to access resources 234 for subsequent login events or sessions to the server 202 and/or resources 234.

In embodiments, the client application 222 can receive, from the authentication module 206 of the server, a first pin 213 associated with the user of the application 222 and a second pin 213 associated with the user of the application 222. The second pin 213 can correspond to a new or updated pin 213 and can be different from the first pin 213 pin 213 or previous pin 213. The client application 222 can provide the second pin 213 to the user of the device 220 through a browser 221 of the device 220.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

We claim:
1. A method comprising:
generating, by a computing device for an application executable on the computing device, cache files for a plurality of users of the application, the cache files store user data corresponding to individual users of the application, and the computing device being a shared computing device so that the cache files are viewable by the plurality of users using the computing device;
generating, by the computing device, an encryption key for one of the cache files, the encryption key being associated with a user of the application, wherein the encryption key is associated with a user identifier so that the encryption key is not accessible by other users of the computing device;
encrypting, by the computing device, user data corresponding to the user for the application in the one of the cache files with the encryption key;
associating, by the computing device, the one of the caches file with a cache lookup key generated using the user identifier;
receiving, by the computing device from the user, the user identifier and a pin that enable access to the encryption key used to decrypt the encrypted user data corresponding to the user for the application;
identifying, by the computing device responsive to receiving the user identifier, the one of the cache files for the user using the cache lookup key;
retrieving, by the computing device using the received pin, the encryption key for the identified one of the cache files configured to decrypt the encrypted user data corresponding to the user for the application; and
presenting, by the computing device to the user, the user data of the encrypted user data decrypted using the encryption key accessed with the pin, the encrypted user data and the encryption key of the user inaccessible to other users of the computing device without the user identifier and the pin.
2. The method of claim 1, further comprising:
storing, by the computing device, the one of the cache files in a cache database, the one of the cache files comprising the encrypted user data, and wherein each of the cache files are segregated in the cache database based on the user associated with the respective cache file.
3. The method of claim 1, further comprising:
receiving, by the computing device and responsive to a prompt provided to the user of the application, the pin from the user of the computing device; and
storing, by the computing device, the encryption key using the pin in a trusted module, wherein the pin is used to retrieve the encryption key from the trusted module, and wherein the encryption key is used to decrypt the encrypted user data in the one of the cache files.

4. The method of claim 1, further comprising:
generating, by the computing device, a prompt for the user of the application through a browser of the computing device, the prompt requesting the pin;
receiving, by the computing device and responsive to the prompt provided to the user of the application, the pin from the user of the application; and
storing, by the computing device, the pin for the user of the application at an authentication module of a server.

5. The method of claim 1, further comprising:
generating, by the computing device, the cache lookup key using the user identifier corresponding to the user of the application.

6. The method of claim 5, further comprising:
storing, by the computing device, a key identifier at the one of the cache files, address data for a trusted module and the cache lookup key, wherein the key identifier corresponds to the encryption key.

7. The method of claim 1, further comprising:
providing, by the computing device, credentials to an authentication module of a server, the credentials corresponding to the user of the application; and
receiving, by the computing device responsive to an authentication performed by the authentication module of the server for the user of the application, permission to access to one or more resources provided through the server.

8. The method of claim 1, further comprising:
receiving, by the computing device, an indication from an authentication module of a server to replace the pin associated with the user of the application, wherein the pin is invalid or expired; and
receiving, by the computing device from the authentication module, a second pin associated with the user of the application to replace the pin associated with the user of the application, the second pin different from the pin.

9. The method of claim 8, further comprising:
retrieving, by the computing device from a trusted module, the encryption key using the pin associated with the user of the application.

10. The method of claim 9, further comprising:
decrypting, by the computing device, the encrypted user data in the one of the cache files using the encryption key.

11. The method of claim 8, further comprising:
transmitting, by the computing device, a request to a trusted module to generate a second encryption key using the second pin associated with the user of the application, the request including the second pin.

12. The method of claim 11, further comprising:
encrypting, by the computing device, the user data in the one of the cache files using the second encryption key.

13. The method of claim 12, further comprising:
updating, by the computing device, the one of the cache files at a cache database with the user data encrypted using the second encryption key.

14. A system comprising:
one or more processors, coupled to memory, configured to:
generate, for an application executable on a computing device, cache files for a plurality of users of the application, the cache files store user data corresponding to individual users of the application, and the computing device being a shared computing device so that the cache files are viewable by the plurality of users using the computing device;
generate an encryption key for one of the cache files, the encryption key being associated with a user of the application, wherein the encryption key is associated with a user identifier so that the encryption key is not accessible by other users of the computing device;
encrypt user data corresponding to the user for the application in the one of the cache files with the encryption key;
associate the one of the caches file with a cache lookup key generated using the user identifier;
receive, from the user, the user identifier and a pin that enable access to the encryption key used to decrypt the encrypted user data corresponding to the user for the application;
identify, responsive to receipt of the user identifier, the one of the cache files for the user using the cache lookup key;
retrieve, using the received pin, the encryption key for the identified one of the cache files configured to decrypt the encrypted user data corresponding to the user for the application; and
present, to the user, the user data of the encrypted user data decrypted using the encryption key accessed with the pin, the encrypted user data and the encryption key of the user inaccessible to other users of the computing device without the user identifier and the pin.

15. The system of claim 14, wherein the one or more processors are further configured to:
receive, responsive to a prompt provided to the user of the application, the pin from the user of the computing device; and
store the encryption key using the pin in a trusted module, wherein the pin is used to retrieve the encryption key from the trusted module, and wherein the encryption key is used to decrypt the encrypted user data in the one of the cache files.

16. The system of claim 14, wherein the one or more processors are further configured to:
generate a prompt for the user of the application through a browser of the computing device, the prompt requesting the pin;
receive, responsive to the prompt provided to the user of the application, the pin from the user of the application; and
store the pin for the user of the application at an authentication module of a server.

17. The system of claim 14, wherein the one or more processors are further configured to:
generate the cache lookup key using the user identifier corresponding to the user of the application.

18. A non-transitory computer-readable medium, comprising instructions that, when executed by a processor of a device, cause the processor to:
generate, for an application executable on the device, cache files for a plurality of users of the application, the cache files store user data corresponding to individual users of the application, and the device being a shared computing device so that the cache files are viewable by the plurality of users using the device;
generate an encryption key for one of the cache files, the encryption key being associated with a user of the application, wherein the encryption key is associated with a user identifier so that the encryption key is not accessible by other users of the device;

encrypt user data corresponding to the user for the application in the one of the cache files with the encryption key;

associate the one of the caches file with a cache lookup key generated using the user identifier;

receive, from the user, the user identifier and a pin that enable access to the encryption key used to decrypt the encrypted user data corresponding to the user for the application;

identify, responsive to receipt of the user identifier, the one of the cache files for the user using the cache lookup key;

retrieve, using the received pin, the encryption key for the identified one of the cache files configured to decrypt the encrypted user data corresponding to the user for the application; and present, to the user, the user data of the encrypted user data decrypted using the encryption key accessed with the pin, the encrypted user data and the encryption key of the user inaccessible to other users of the device without the user identifier and the pin.

19. The computer-readable medium of claim 18, further comprising instructions that cause the processor to:

receive, responsive to a prompt provided to the user of the application, the pin from the user of the device; and store the encryption key using the pin in a trusted module, wherein the pin is used to retrieve the encryption key from the trusted module, and wherein the encryption key is used to decrypt the encrypted user data in the one of the cache files.

20. The computer-readable medium of claim 18, further comprising instructions that cause the processor to:

generate a prompt for the user of the application through a browser of the device, the prompt requesting the pin;

receive, responsive to the prompt provided to the user of the application, the pin from the user of the application; and store the pin for the user of the application at an authentication module of a server.

\* \* \* \* \*